(12) United States Patent
Pahle et al.

(10) Patent No.: US 10,066,690 B2
(45) Date of Patent: Sep. 4, 2018

(54) BRAKE DISC-HUB CONNECTION

(71) Applicant: KNORR-BREMSE Systeme fuer Nutzfahrzeuge GmbH, Munich (DE)

(72) Inventors: Wolfgang Pahle, Bad Wiessee (DE); Stephan Kotteder, Osterhofen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/357,777

(22) Filed: Nov. 21, 2016

(65) Prior Publication Data

US 2017/0122391 A1    May 4, 2017

Related U.S. Application Data

(63) Continuation of application No. PCT/EP2015/061310, filed on May 21, 2015.

(30) Foreign Application Priority Data

May 22, 2014 (DE) .......... 10 2014 107 228

(51) Int. Cl.
*F16D 65/12* (2006.01)
*F16D 65/02* (2006.01)

(52) U.S. Cl.
CPC .... *F16D 65/123* (2013.01); *F16D 2065/1368* (2013.01); *F16D 2065/1384* (2013.01); *F16D 2065/1392* (2013.01)

(58) Field of Classification Search
CPC ............................... F16D 65/12; F16D 65/123
USPC .................................................. 188/218 XL
See application file for complete search history.

(56) References Cited

U.S. PATENT DOCUMENTS

| 6,457,567 | B1 | 10/2002 | Bunker |
| 6,520,296 | B1 | 2/2003 | Bunker |
| 6,910,556 | B1 | 6/2005 | Baumgartner et al. |
| 7,934,777 | B1 | 5/2011 | Yuhas |
| 8,739,946 | B2 | 6/2014 | Pahle et al. |

(Continued)

FOREIGN PATENT DOCUMENTS

| CN | 101213387 A | 7/2008 |
| CN | 101815883 A | 8/2010 |

(Continued)

OTHER PUBLICATIONS

EPO machine translation; DE 195 07 922 A1, Dellmann et al., Nov. 1995. (Year: 1995).*

(Continued)

*Primary Examiner* — Thomas J Williams
(74) *Attorney, Agent, or Firm* — Crowell & Moring LLP

(57) ABSTRACT

A brake disc-hub connection is provided, wherein a hub has drivers, which extend from a wheel flange of the hub in the axial direction relative to a rotational axis common to a brake disc and the hub and engage in a toothed manner between supporting elements, which are arranged on the inner circumference of a brake disc and extend in the direction of the rotation axis. Lateral flanks of the drivers are oriented radially to the rotation axis and lateral flanks of the supporting elements are oriented parallel to the lateral flanks of the drivers. The lateral flanks of each of the drivers are oriented at an angle of 15° to 30° to each other.

18 Claims, 22 Drawing Sheets

(56) References Cited

U.S. PATENT DOCUMENTS

| | | | |
|---|---|---|---|
| 2003/0066715 A1* | 4/2003 | Baumgartner | F16D 65/123 188/18 A |
| 2004/0178030 A1* | 9/2004 | Pacchiana | F16D 65/123 188/218 XL |
| 2008/0128229 A1 | 6/2008 | Pahle | |
| 2009/0218183 A1 | 9/2009 | Burgoon et al. | |
| 2010/0307875 A1 | 12/2010 | Ilg et al. | |
| 2011/0067963 A1 | 3/2011 | Pahle | |
| 2012/0175202 A1* | 7/2012 | Pahle | F16D 65/123 188/218 XL |
| 2014/0339027 A1 | 11/2014 | Wurth et al. | |

FOREIGN PATENT DOCUMENTS

| | | | |
|---|---|---|---|
| CN | 201568494 U | 9/2010 | |
| CN | 101945788 A | 1/2011 | |
| DE | 19507922 A1 * | 11/1995 | F16D 65/123 |
| DE | 196 28 331 A1 | 1/1998 | |
| DE | 19931140 A1 * | 2/2000 | F16D 65/12 |
| DE | 199 18 069 A1 | 11/2000 | |
| DE | 699 03 323 T2 | 5/2003 | |
| DE | 699 08 785 T2 | 5/2004 | |
| DE | 10 2008 014 857 A1 | 9/2009 | |
| DE | 10 2009 019 420 A1 | 11/2010 | |
| DE | 10 2010 026 070 A1 | 1/2011 | |
| DE | 20 2011 052 267 U1 | 5/2013 | |
| EP | 0 912 839 B1 | 11/2003 | |
| EP | 1 929 169 A2 | 6/2008 | |
| EP | 2 207 981 A1 | 7/2010 | |
| JP | 2006-38025 A | 2/2006 | |
| RU | 2 472 048 C2 | 1/2013 | |
| SU | 331574 A1 | 6/1972 | |
| SU | 1625750 A1 | 2/1991 | |

OTHER PUBLICATIONS

EPO machine translation: DE 199 31 140 A1, Mueller et al., Feb. 2000. (Year: 2000).*

International Preliminary Report on Patentability (PCT/IB/373) issued in PCT Application No. PCT/EP2015/061310 dated Nov. 22, 2016, including English translation of document C2 (German-language Written Opinion (PCT/ISA/237)) previously filed on Nov. 21, 2016 (6 pages).

German-language Written Opinion (PCT/ISA/237) issued in PCT Application No. PCT/EP2015/061310 dated Aug. 31, 2015 (five (5) pages).

German Office Action issued in counterpart German Application No. 10 2014 107 228.6 dated Dec. 9, 2014 (eight (8) pages).

Russian-language Office Action issued in counterpart European Application No. 2016150197/11(080608) dated Feb. 28, 2018 with English translation (twelve (12) pages).

Chinese-language Office Action issued in counterpart Chinese Application No. 201580027039.5 dated Apr. 18, 2018 with English translation (ten (10) pages).

* cited by examiner

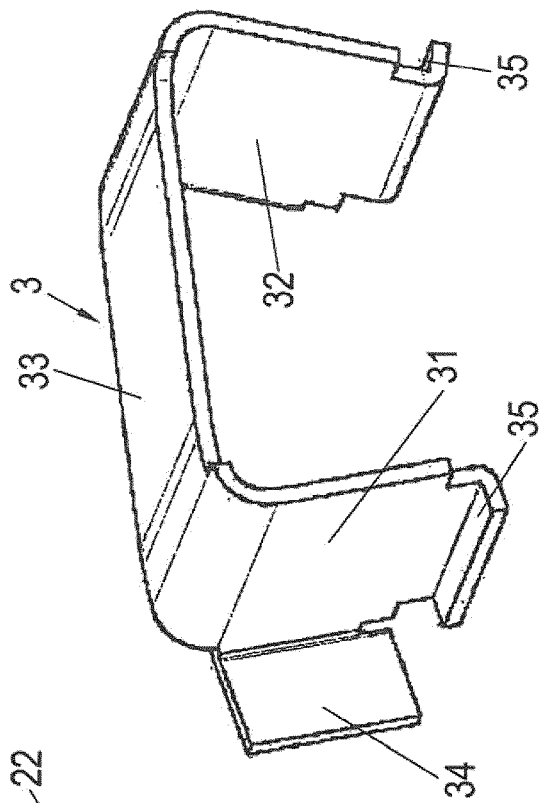
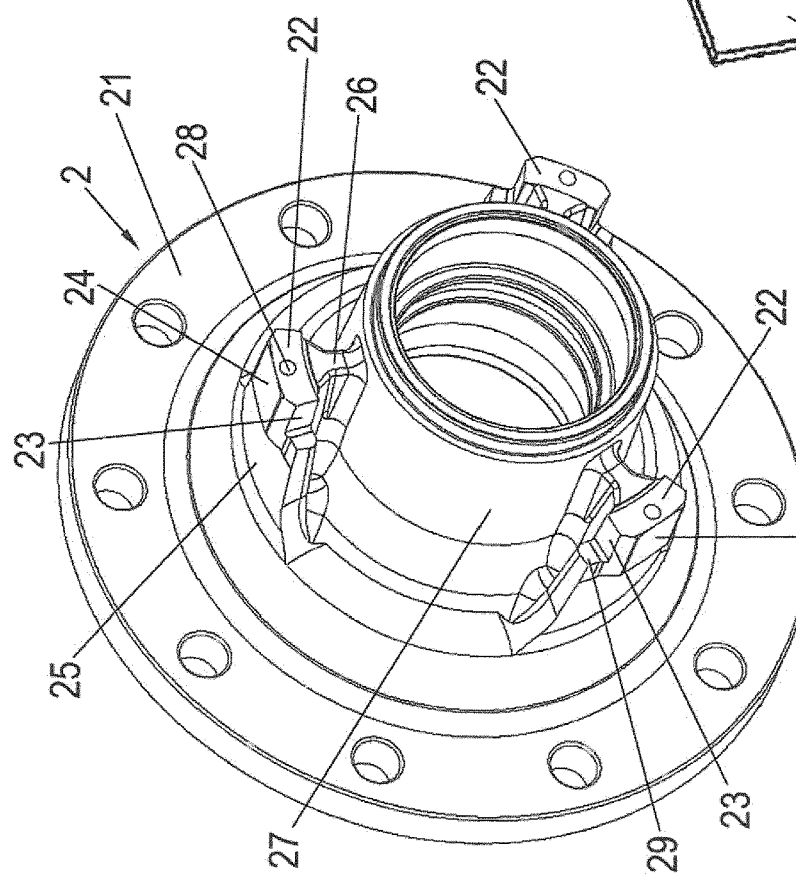

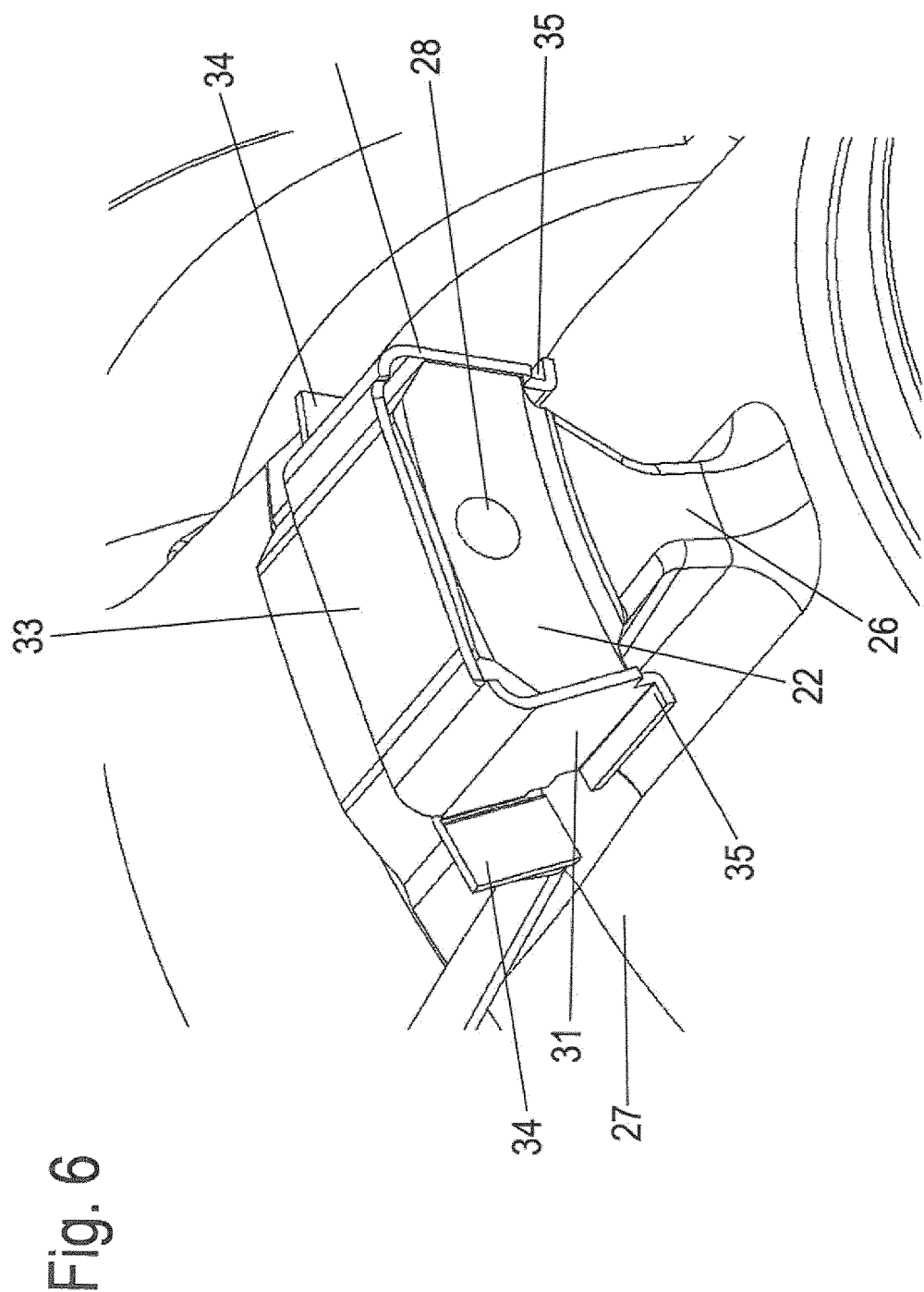

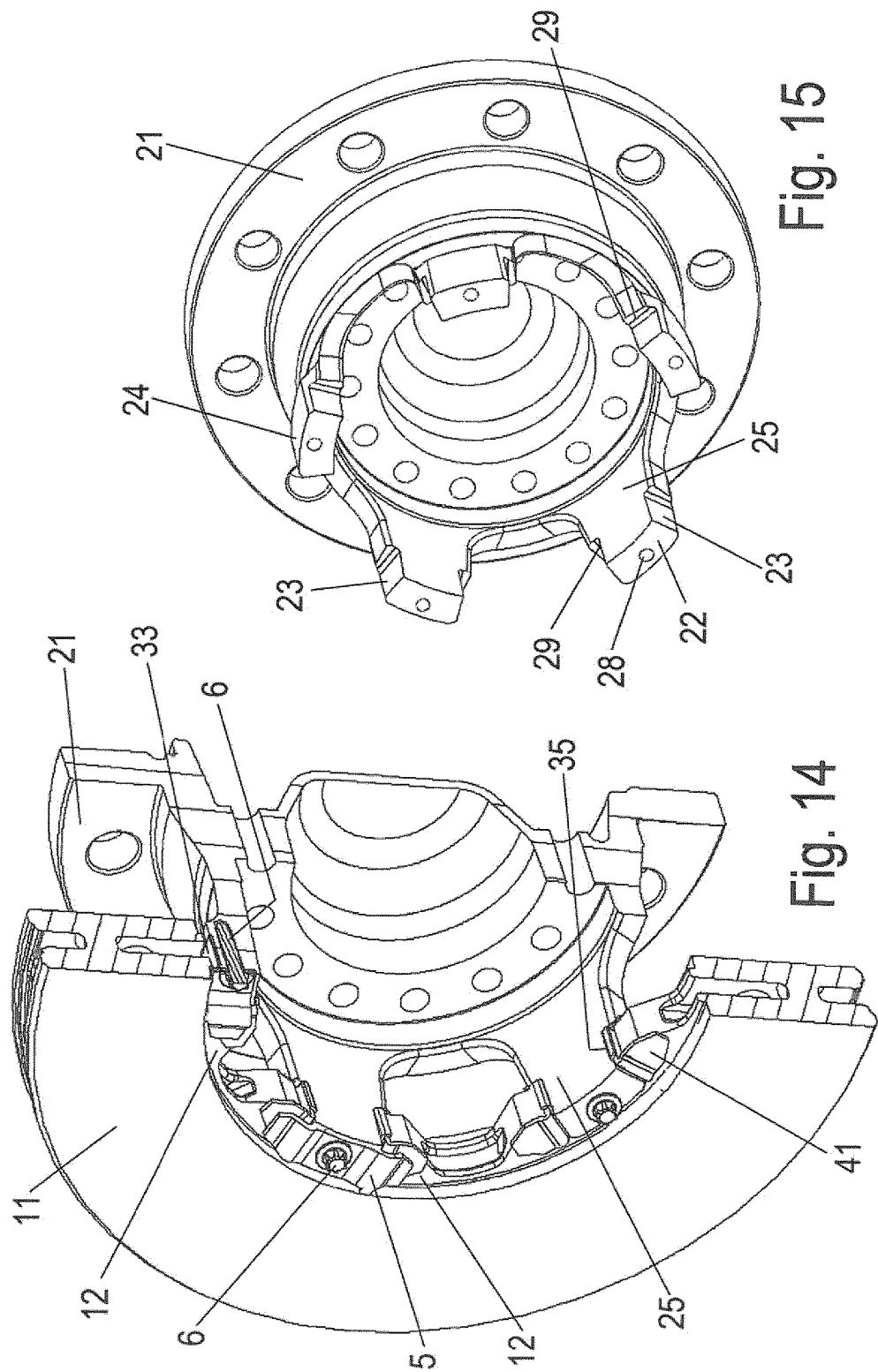

BRAKE DISC-HUB CONNECTION

CROSS REFERENCE TO RELATED APPLICATIONS

This application is a continuation of PCT International Application No. PCT/EP2015/061310, filed May 21, 2015, which claims priority under 35 U.S.C. § 119 from German Patent Application No. 10 2014 107 228.6, filed May 22, 2014, the entire disclosures of which are herein expressly incorporated by reference.

BACKGROUND AND SUMMARY OF THE INVENTION

The present invention relates to a brake disc-hub connection wherein a hub has drivers which extend from a wheel flange of the hub in the axial direction relative to a rotational axis common to a brake disc and the hub and which engage in a tooth-like manner between supporting elements which are arranged on the inner circumference of a brake disc and which extend in the direction of the rotational axis.

For improving the thermal crack resistance of brake discs it has proved advantageous if the friction ring of the brake disc is able to expand radially and is designed symmetrically. To this end there are various proposals in the prior art. Thus a generic brake disc-hub connection is disclosed in DE 199 18 069 A1 in which the connection of the brake disc to the hub takes place by use of tooth-like elements on the hub and on the brake disc which engage in one another and which ensure a transmission of the braking torque from the brake disc to the hub.

In this case, the teeth have a significant wedge shape. If the brake disc is subjected to high temperatures it may lead to internal component stresses which allow the brake disc to shrink slightly in diameter. In this case, the wedge shape of the teeth may lead to a clamping of the brake disc in the connection thereof which impedes, on the one hand, the thermal expansion and, on the other hand, the servicing relative to the dismantling of the components.

In particular for easier dismantling, solutions are disclosed in DE 10 2009 019 420 A1 or the aforementioned DE 199 18 069 A1 in which intermediate elements are provided between the tooth-like elements engaging in one another on the hub and the brake disc, the dismantling being simplified thereby.

For reducing a heat input caused by a braking procedure, it is disclosed for example in DE 10 2008 014 857 A1 to insert intermediate elements between the teeth of the brake disc and/or the hub, a direct heat transfer being prevented thereby.

It is the object of the present invention to provide a brake disc-hub connection with an improved capacity for servicing and a further reduced heat input.

This and other objects are achieved by a brake disc-hub connection according to the invention, in which a hub has drivers which extend from a wheel flange of the hub in the axial direction relative to a rotational axis common to a brake disc and the hub and which engage in a tooth-like manner between supporting elements which are arranged on the inner circumference of a brake disc and which extend in the direction of the rotational axis. Lateral flanks of the drivers are oriented radially to the rotational axis or parallel to a radial line and lateral flanks of the supporting elements are oriented parallel to the lateral flanks of the drivers, wherein the lateral flanks of each of the drivers are oriented at an angle of 15° to 30° to each other. Preferably, the lateral flanks of each of the drivers viewed from the rotational axis (A) are oriented at an angle of 15° to 30° to one another.

By the radial or at least approximately radial orientation of the lateral flanks of the drivers to the rotational axis, a brake disc-hub connection is provided in which the braking forces occur in the interface between the hub and the brake disc almost exclusively as purely normal forces.

By the orientation of the lateral flanks of the drivers of the hub such that the tangents thereof meet in the rotational center of the hub and/or inside an area of a circle, the centerpoint thereof being the rotational center the hub, and with a corresponding design of the lateral flanks of the brake supporting elements of the brake disc, the braking torque is transmitted into this toothing virtually as a purely normal force. The tangents of the lateral flanks of the supporting elements of the brake disc, therefore, either meet in the rotational axis or—with a use of intermediate elements which form the subject of some of the subclaims—on or in a circle with double the diameter of the corresponding double thickness of the intermediate elements.

The tooth shape which has thus been altered of the drivers and the supporting elements also reduces the wedge effect of the brake disc toothing and, as a result, the clamping of the brake disc.

The orientation of the lateral flanks of each of the drivers at an angle of 15° to 30° ensures the transmission of high braking torques. The width of the drivers in the circumferential direction is, therefore, defined by the size of the angle between the lateral flanks of the driver. The larger this angle, the more rigid the toothed connection.

However, with an angle which increases in size, the intermediate space which is available between two such drivers for ventilating the brake disc is smaller. It has proved advantageous that an angle of between 15° to 30° determining the width of the drivers is optimal with regard to the rigidity required for the transmission of the braking torque and with regard to a sufficiently large intermediate space for ventilating the brake disc.

Particularly preferably, the lateral flanks of each of the drivers, viewed from the rotational axis, in this case are oriented at an angle of 23° to 25°, in particular of 24°, to one another.

According to one variant, the drivers are configured as front ends of support webs extending axially away from the wheel flange.

According to a preferred variant of the invention, a push-on stop is integrally formed on at least one of the lateral flanks of each of the drivers, for axially fixing the brake disc. This permits additional components and mounting effort on the hub and/or the brake disc, for the axial fixing of the brake disc on the hub, to be dispensed with.

In a further variant, each of the support webs has slots extending axially from the driver in the direction of the wheel flange to form lateral support webs, wherein the front faces of the free ends of the support webs are configured as a push-on stop for axially fixing the brake disc.

By the thermal separation formed thereby between the push-on stop, the supporting elements of the brake disc heated during a braking procedure bearing thereagainst during operation, and the respective driver, a reduction of stresses is possible due to the variable temperatures of the brake disc relative to the hub.

According to a further variant of the brake disc-hub connection according to the invention, first intermediate elements are arranged in the intermediate spaces between the lateral flanks of the drivers and the supporting elements, said first intermediate elements encompassing the drivers in a radial and U-shaped manner in the circumferential direction and bearing at least against the opposing flanks of the drivers in a planar manner. The U-shaped design of these intermediate elements in this case permits a particularly simple mounting.

According to a further preferred variant, second intermediate elements are arranged between the lateral flanks of the supporting elements and the arms of the first intermediate elements bearing against the lateral flanks of the drivers, said second intermediate elements being able to be mounted separately between the first intermediate elements.

These second intermediate elements are particularly preferably configured as angled elements with two arms oriented at an angle, in particular at right-angles to one another, wherein in the mounted state a first arm is clamped between the lateral flank of one of the supporting elements and the lateral flank of one of the first intermediate elements and a second arm bears against the front face of the supporting element applied to the wheel flange of the hub.

A further improved thermal insulation between the brake disc and the hub is permitted by the introduction of two separate intermediate elements between the flanks of the drivers and the supporting elements. Moreover, two such separately mountable intermediate elements also contribute to improving the ease of servicing (in particular when replacing the brake disc).

In order to avoid adhesion of the two intermediate elements bearing against one another by the action of moisture, the first and second intermediate elements preferably consist of a non-rusting material or are provided with a non-rusting coating, so that the first and second intermediate elements may be easily mounted and/or dismantled when installed and also when dismantled.

Additionally, such non-rusting materials and/or non-rusting coatings have a low coefficient of friction which in the case of servicing permits a simple axial connection of the brake disc.

According to a further preferred variant, in the region of the brake disc-hub connection the first intermediate elements form a separating layer between the brake disc and the hub. To this end, particularly preferably the free ends of the arms of the first intermediate elements extending approximately radially to the rotational axis are configured as separating webs bent back outwardly and extending axially to the rotational axis, in each case a lower face of the supporting elements extending axially to the rotational axis or a lower edge of the first arm of the second intermediate element being able to be supported on said separating webs.

Additionally, preferably separating surfaces are integrally formed on the lateral arms of the first intermediate elements on a side facing the wheel flange of the hub, said separating surfaces being oriented parallel to the plane of the brake disc and covering a push-on stop integrally formed on the hub and axial to the rotational axis, for the axial fixing of the brake disc relative to the brake disc.

By the first intermediate elements configured with such projections, an improved thermal insulation of the brake disc from the hub is ensured, since the brake disc is insulated relative to the hub on all contact surfaces, by the first intermediate element being positioned on the driver of the hub.

According to a further preferred variant, the transitions between the separating webs and the arms of the first intermediate elements extending approximately radially to the rotational axis are configured as depressions, respective lower edges of the first arm of the second intermediate elements being able to be supported in said depressions by being inserted therein.

As a result, the lower edges of the first arm of the second intermediate elements are additionally secured against slippage in the circumferential direction relative to the rotational axis of the brake disc.

Preferably, the first and the second intermediate elements are positively connected together. Particularly preferably, openings are formed on a region of the separating surfaces in the vicinity of the lateral arms of the first intermediate elements, in each case a nose of one of the second intermediate elements extending therethrough in the mounted state, wherein the nose extends from the end of the first arm spaced apart from the second arm.

As a result, the second intermediate elements are effectively prevented from migrating radially to the rotational axis of the brake disc after mounting on the first intermediate elements.

According to a further preferred variant, a spring element is able to be fastened on a side of the drivers remote from the wheel flange of the hub for axially fixing the intermediate elements.

In order to achieve sufficient ventilation of the brake disc, the hub preferably has a total of three, four or five drivers and the brake disc correspondingly has six, eight or ten supporting elements.

As a result, it is possible, in particular, to provide larger recesses between the supporting elements of the brake disc (in comparison with those brake discs known from the prior art with a considerably greater number of supporting elements), whereby the cool air cross section is considerably enlarged.

According to a further preferred variant the hub has a wheel flange extending radially outwardly to the rotational axis, the drivers extending axially therefrom to the rotational axis.

In a preferred variant, the hub has a pot-like hollow-cylindrical portion which merges with the wheel flange extending radially outwardly to the rotational axis, wherein the drivers are supported by webs rising radially outwardly from the pot-like portion and extending axially toward the wheel flange.

The axial extent of the drivers away from the wheel flange of the hub in this case also contributes to improved thermal insulation of the brake disc relative to the hub.

Exemplary embodiments of the invention are described in more detail hereinafter with reference to the accompanying drawings, in which:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 is a perspective view of a variant of a hub with drivers arranged thereon.

FIG. 5 is a perspective view of a variant of a first intermediate element.

FIG. 6 is a perspective detailed view of a first intermediate element positioned on one of the drivers of the hub.

FIG. 14 is a perspective view of a partially cut-away brake disc-hub connection according to FIG. 13.

FIG. 15 is a perspective view of the hub shown in FIGS. 13 and 14.

DETAILED DESCRIPTION OF THE DRAWINGS

In the following description of the figures, terms such as above, below, left, right, front, rear, etc. exclusively refer to the exemplary view selected in the respective figures and position of the brake disc, hub, supporting elements, drivers, intermediate elements, and the like. These terms are not to be understood as limiting, i.e. these references may be altered by different operating positions or a mirror-symmetrical design or the like.

Figure 1:
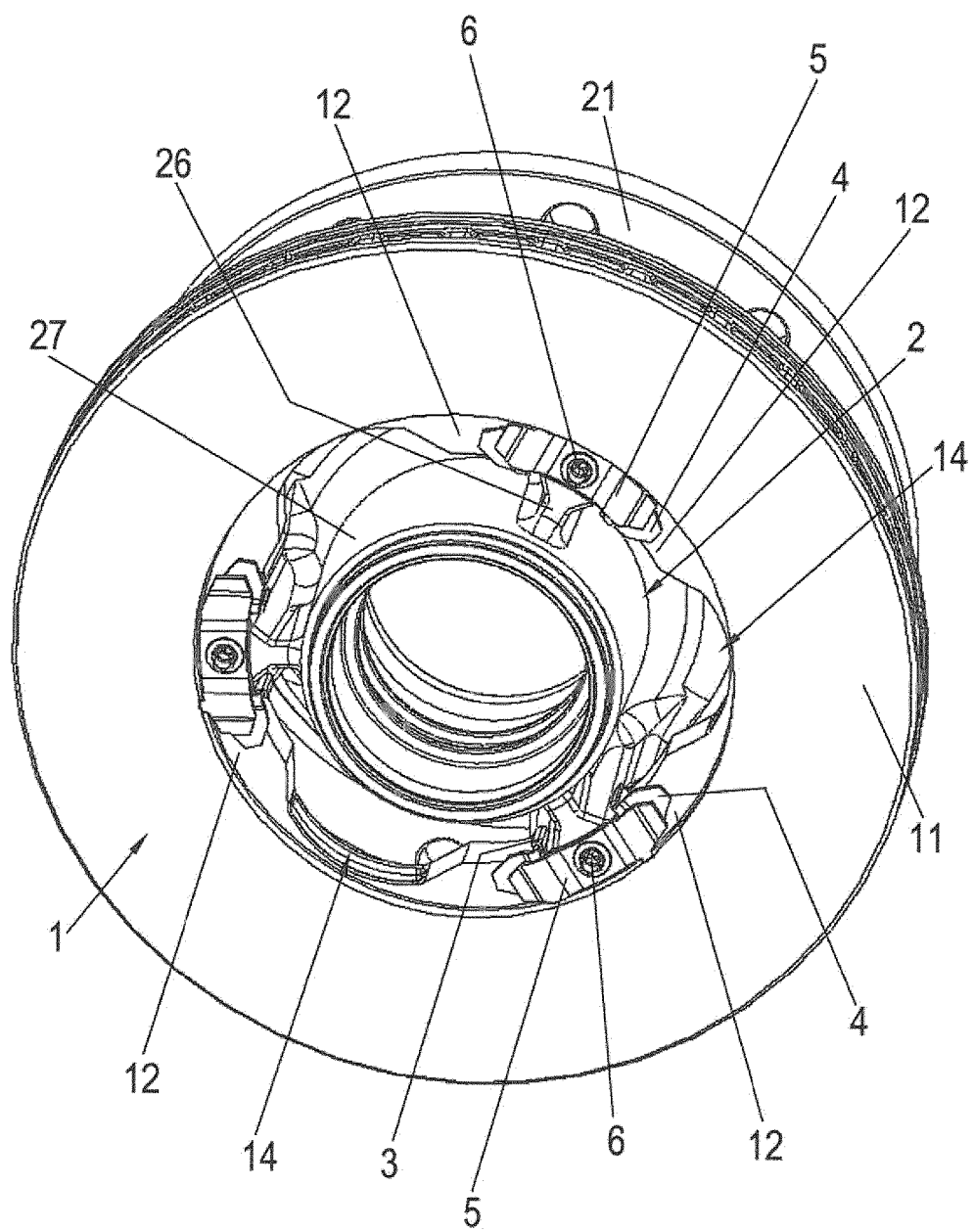
FIG. 1 is a perspective view of a hub with a brake disc and with a brake disc-hub connection.
Figure 2:
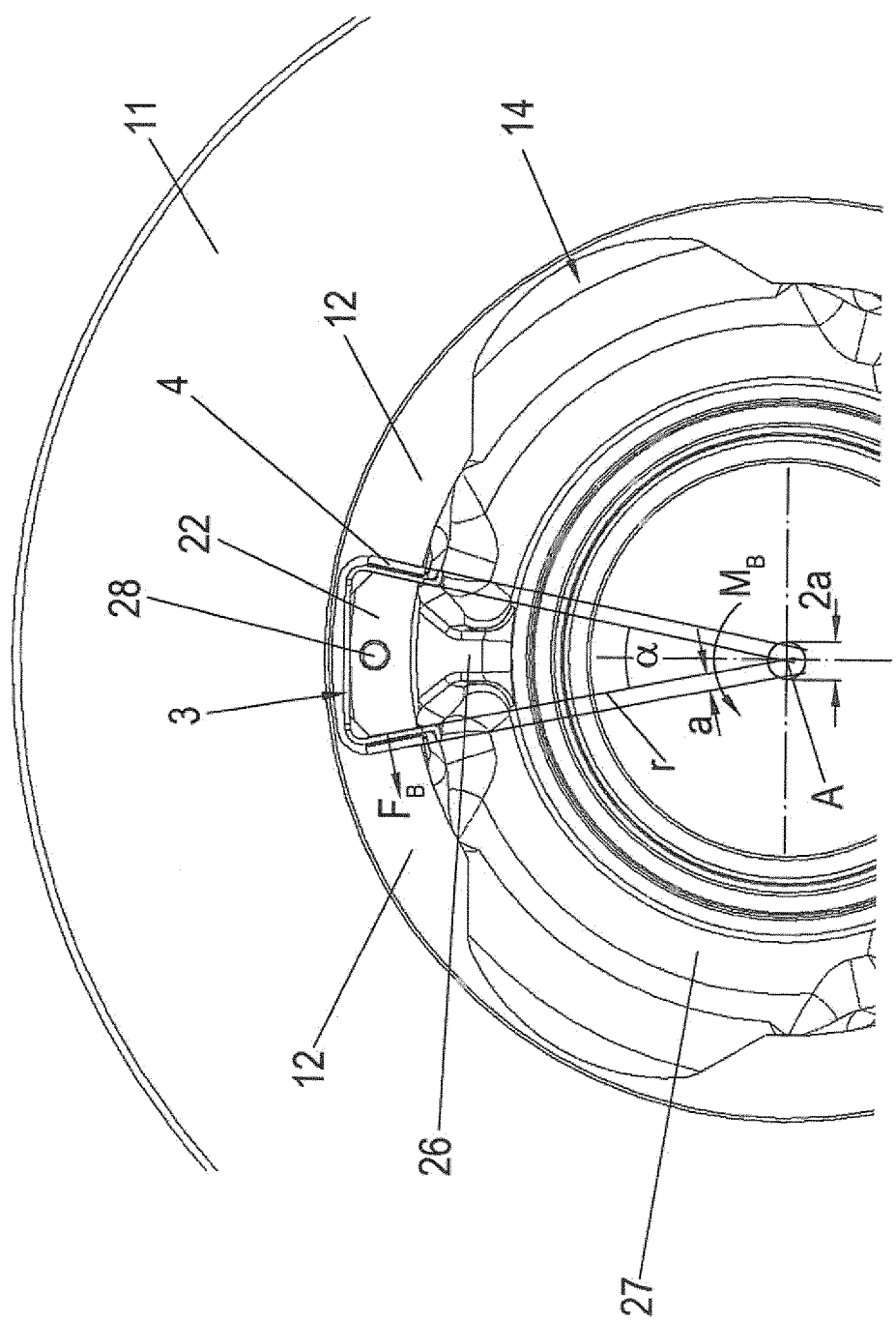
FIG. 2 is a plan view of the brake disc-hub connection of FIG. 1 with a view of the geometry of the drivers of the hub and/or the supporting elements of the brake disc and the forces resulting therefrom.
Figure 3:
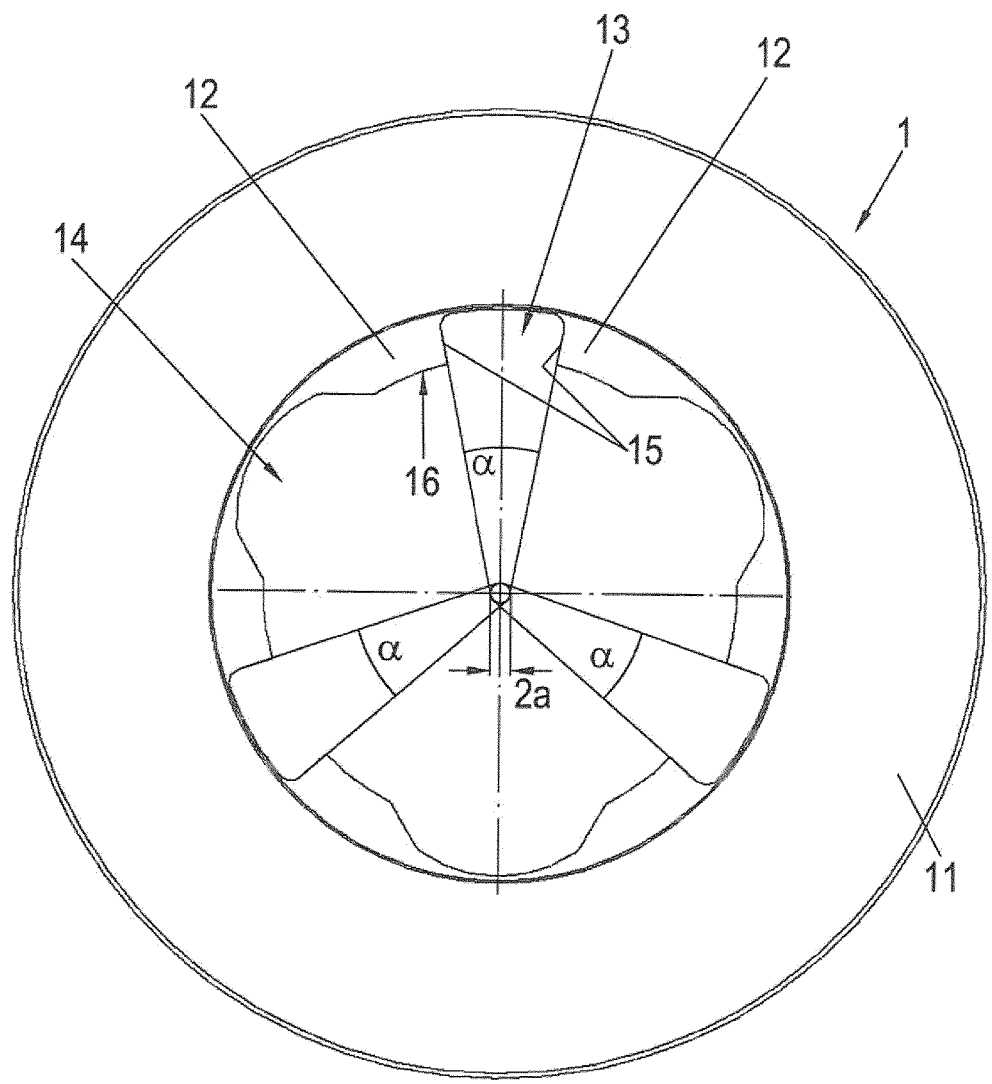
FIG. 3 is a plan view of a variant of a brake disc shown in FIGS. 1 and 2.
Figure 7:
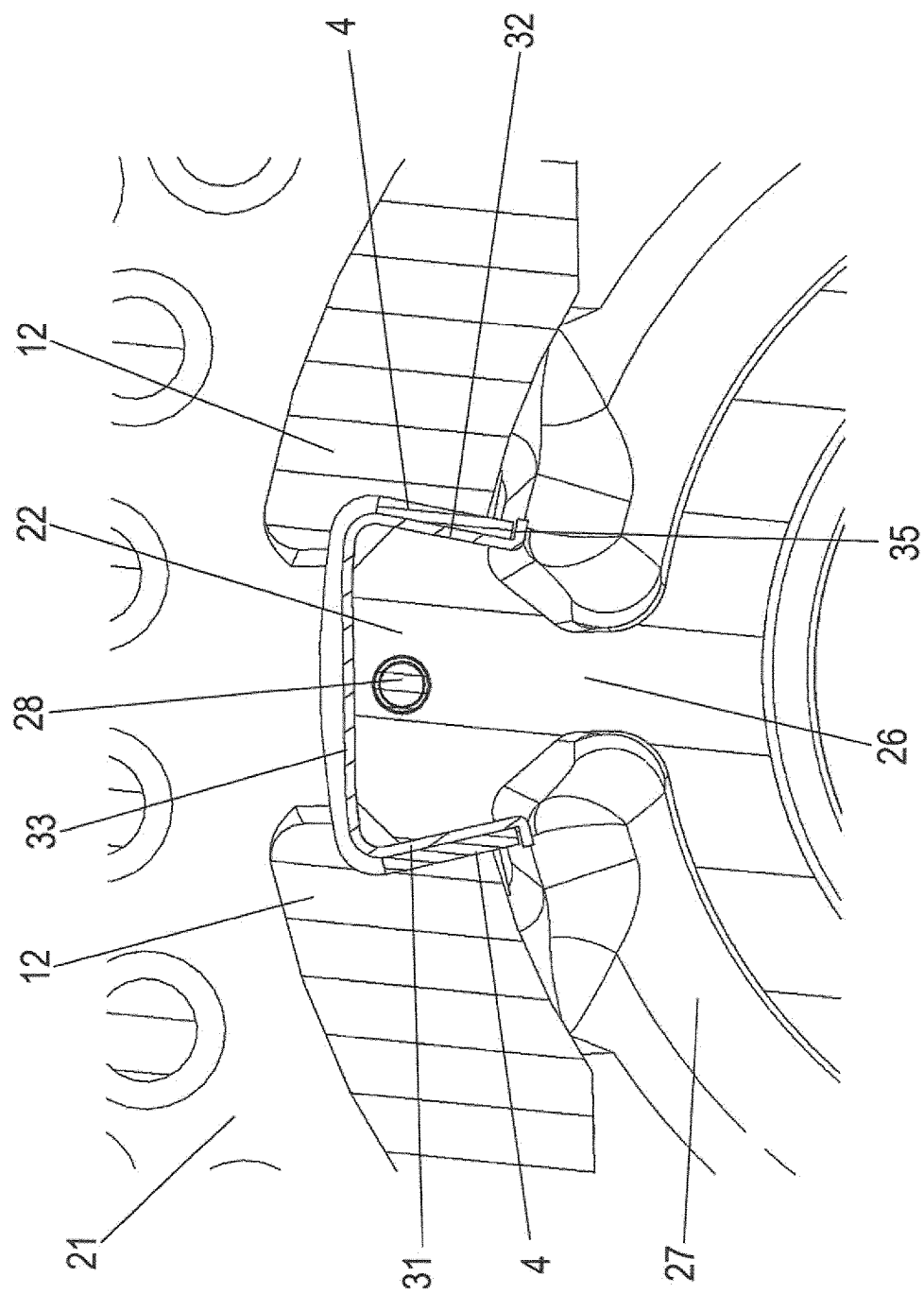
FIG. 7 is a sectional view of the brake disc-hub connection with the mounted intermediate elements.

A brake disc-hub connection is shown in FIG. 1. The brake disc-hub connection serves for connecting an annular internally ventilated brake disc 1 to a hub 2 and is configured as a brake disc-hub, optionally also in connection with the function of a wheel hub, the brake disc 1 being able to be axially positioned and/or having been positioned thereon. In this case, such as for example as shown in FIG. 2, the brake disc 1 and the hub 2 have a common rotational axis A.

The brake disc 1 in this case is preferably configured as an internally ventilated brake disc, with two friction rings 11 which are connected together via webs and on the internal circumference via a circumferential annular portion.

For transmitting the torque, in particular in braking procedures, radially inwardly extending teeth—called supporting elements 12—arranged spaced apart from one another and uniformly distributed over the circumference, are integrally formed on the internal circumference of the brake disc 1.

The hub 2 may be configured in different ways. Thus, for example, a hub 2 is shown in FIGS. 1, 4, 10, 11 with a pot-like hollow cylindrical portion 27 and a wheel flange 21 extending radially outwardly to the rotational axis A, drivers 22 extending axially therefrom to the rotational axis A. For supporting the drivers 22, webs 26 extending axially to the wheel flange 21 are integrally formed on the outer circumference of the hollow cylindrical portion 27.

The drivers 22 in this case are preferably configured as front ends of support webs, wherein the support webs 25 extend axially away from the wheel flange 21. The circumferential width of the support webs 25 in this case is preferably greater than the circumferential width of the drivers 22.

Figure 13:
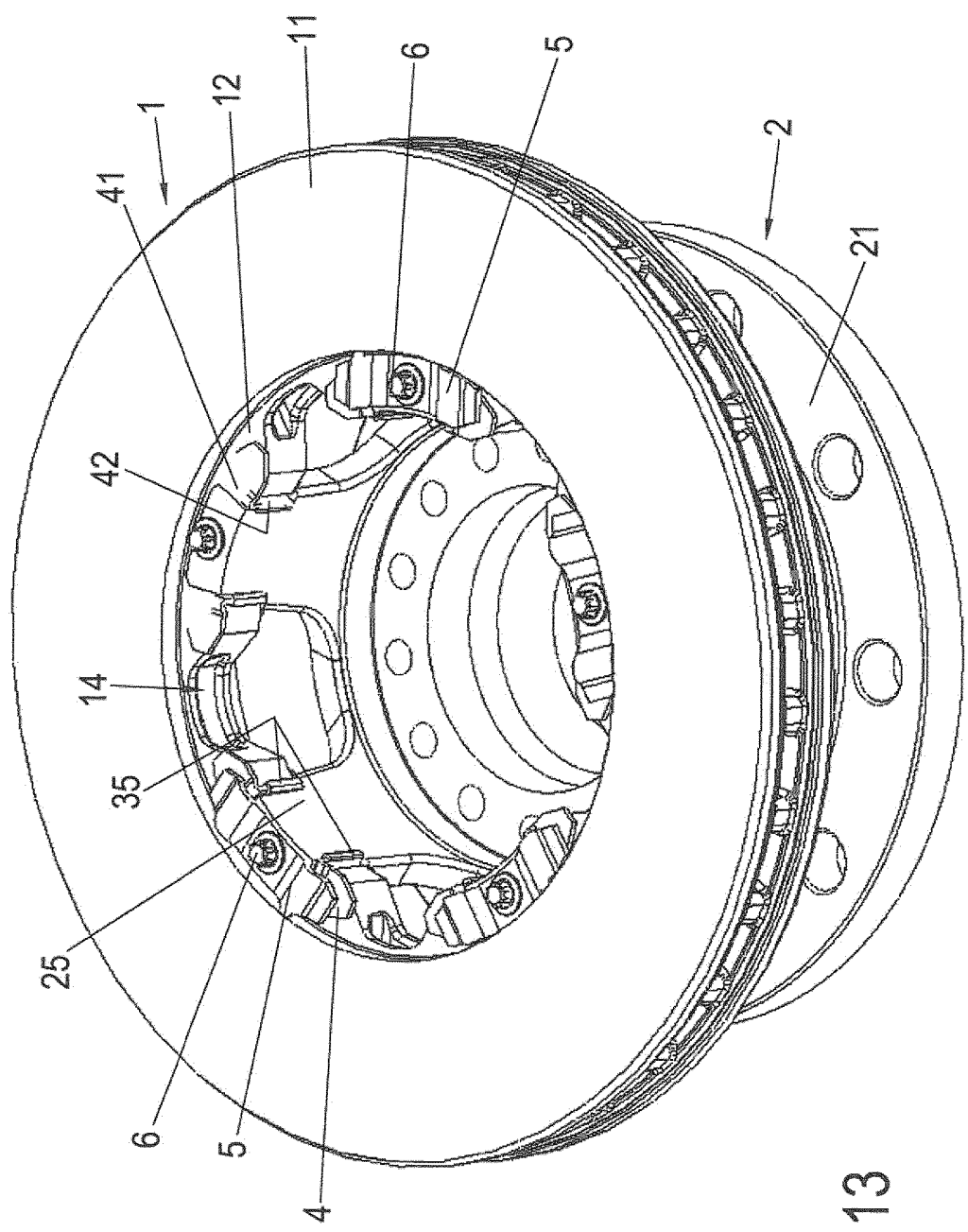
FIG. 13 is a perspective view of a hub with the brake disc mounted thereon with an alternative embodiment of the hub.
Figure 16:
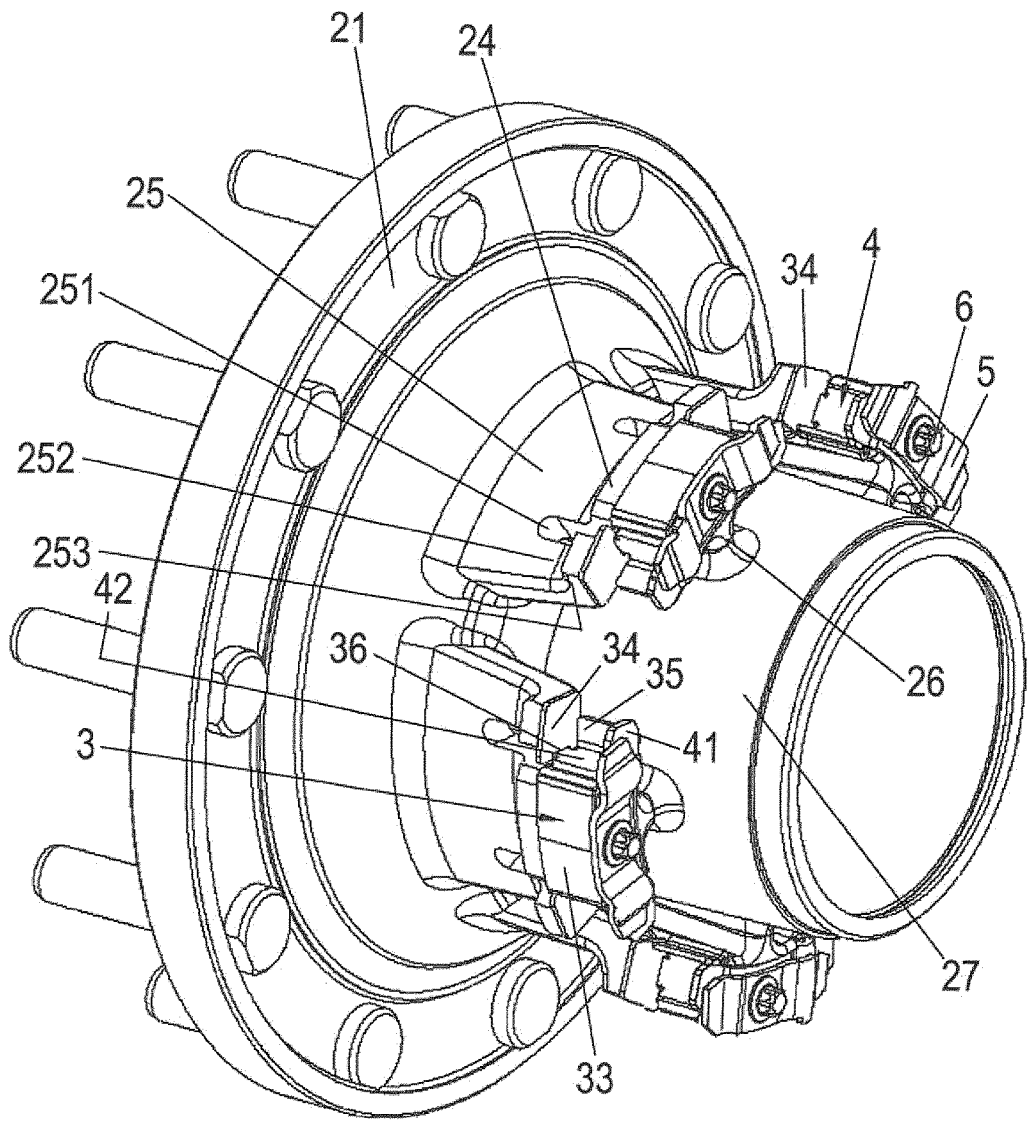
FIG. 16 is a perspective view of a further variant of a hub configured with five drivers with the mounted first and second intermediate elements.

In the brake disc-hub connection according to FIGS. 13 to 15, the drivers 22 also extend from the wheel flange 21 axially to the front, and are not supported on their lower face via corresponding webs 26 on a hollow cylindrical portion 27 of the hub, but protrude freely in the axial direction.

The drivers 22 of the hub 2 in this case correspond, in the sense of interlocking, with the supporting elements 12 on the internal circumference of the brake disc 1. The drivers 22 in this case respectively engage in the circumferential direction in the free space (recesses 13) between two adjacent supporting elements 12.

As may be seen clearly in FIG. 2, the drivers 22 are configured such that they widen radially, from inwardly to outwardly. The lateral flanks 23 of the drivers 22 extending radially and axially to the rotational axis A, in this case viewed from the rotational axis A, are oriented to one another at an angle $\alpha$ of 15° to 30°, preferably of 20° to 30°. This angle $\alpha$ and the radial spacing of the drivers 22 from the rotational axis A in this case determine the width of the drivers 22 in the circumferential direction. It is also conceivable that the lateral flanks 23 of the drivers 22 extend offset in parallel, preferably by a few millimeters, relative to a radial line from the rotational axis A.

The lateral flanks 15 of the supporting elements 12 in this case are oriented parallel to the lateral flanks 23 of the drivers 22. Thus, in a simple manner a brake disc-hub connection is provided in which, in contrast to the prior art, in the interface on the flanks 15, 23 of the supporting elements 12 and/or the drivers 22, the braking forces $f_B$ occur only as purely normal forces or at least approximately as purely normal forces.

According to a preferred variant, for the axial fixing of the brake disc 1, a push-on stop 29 is integrally formed on at least one of the lateral flanks 23 of each of the drivers 22 of the hub 2, the brake disc 1 in the mounted state being pressed thereagainst, as is explained below in more detail.

The lateral flanks 15 of the supporting elements 12 in this case may bear either directly against the lateral flanks 23 of the drivers 22 or, according to the variants shown by way of example in FIG. 2, in each case may bear against the first intermediate elements 3 or second intermediate elements 4 which are configured in corresponding intermediate spaces between the supporting elements 12 and the drivers 22 in the circumferential direction.

The first intermediate elements 3 in this case encompass the drivers 22 radially outwardly and in the circumferential direction and in this case bear at least against the opposing flanks 23 of the drivers 22 in a planar manner, as shown in FIG. 6.

A variant of the first intermediate elements 3 is shown in a perspective view in FIG. 5. As may be seen in FIG. 5, the first intermediate elements 3 in this case consist of a substantially U-shaped body with respective arms 31, 32 which bear in the mounted state against the lateral flanks 23 of the drivers 22 and which are connected together via a bridging element 33 which, as is visible in FIG. 2, at least partially bears against the radially outward upper surface 24 of the driver 22.

According to the preferred variant shown in FIG. 5, the free ends of the arms 31, 32 extending radially to the rotational axis A of these first intermediate elements 3 are configured as separating webs 35, which are outwardly bent back and extend axially to the rotational axis A, in each case a lower face 16 of the supporting elements 12 extending axially to the rotational axis A, or a lower edge of the first arm 42 of a second intermediate element 4, being able to be supported thereon, which is explained in more detail below.

The two arms 31, 32 of the first intermediate elements extending approximately radially to the rotational axis A are oriented at an angle α of 15° to 30° to one another, according to the orientation of the lateral flanks 23 of the drivers 22. In a particularly preferred variant, the lateral flanks 23 of the drivers 22 and correspondingly also the arms 31, 32 of the first intermediate elements 3, viewed from the rotational axis A, are oriented relative to one another at an angle α of 20° to 30°, particularly preferably of 23° to 25°, in particular of 24°.

This angle of 15° to 30° has proved particularly appropriate, on the one hand, with regard to the width of the drivers 22 associated therewith and the associated load bearing capacity for receiving the applied braking torque and, on the other hand, with regard to the remaining intermediate spaces which, preferably with the provision of three, four or five drivers 22 distributed equally on the hub 2 in the circumferential direction, are sufficiently large in order to permit a sufficient ventilation of the brake disc 1.

As is also visible in FIG. 5, separating surfaces 34 oriented parallel to the plane of the brake disc 1 are integrally formed on the lateral arms 31, 32 of the first intermediate elements 3 on a side facing the wheel flange 21 of the hub 2, said separating surfaces covering the push-on stops 29 which are integrally formed on the hub 2, axially to the rotational axis A, for axially fixing the brake disc 1 as shown in FIG. 6.

As is clearly visible, for example in FIGS. 1, 2 and 7 to 9, second intermediate elements 4 are arranged between the lateral flanks 15 of the supporting elements 12 and arms 31, 32 of the first intermediate elements 3 bearing against the lateral flanks 23 of the drivers 22, said second intermediate elements being able to be mounted separately from the first intermediate elements 3 in order to provide additionally thermal insulation of the brake disc 1 from the hub 2.

The provision of two intermediate elements 3, 4, which are able to be mounted separately for the thermal insulation of the brake disc 1 from the hub 2, has the further advantage that said intermediate elements are able to be mounted in a simple manner and, in particular, are also able to be dismantled again in a simple manner, for example when the brake disc is intended to be replaced.

Figure 8:
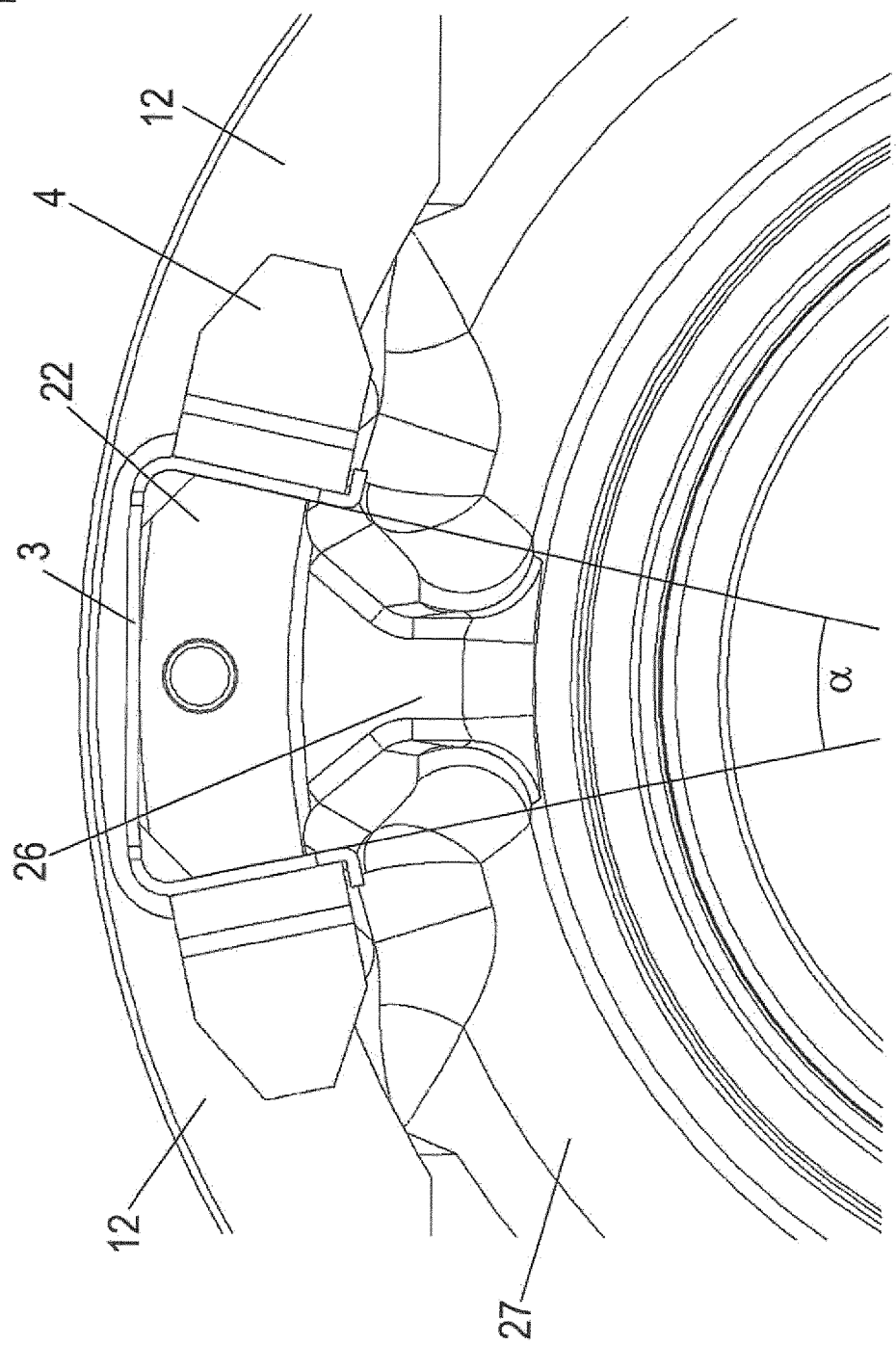
FIG. 8 is a plan view of the brake disc-hub connection with the mounted first and second intermediate elements.
Figure 9:
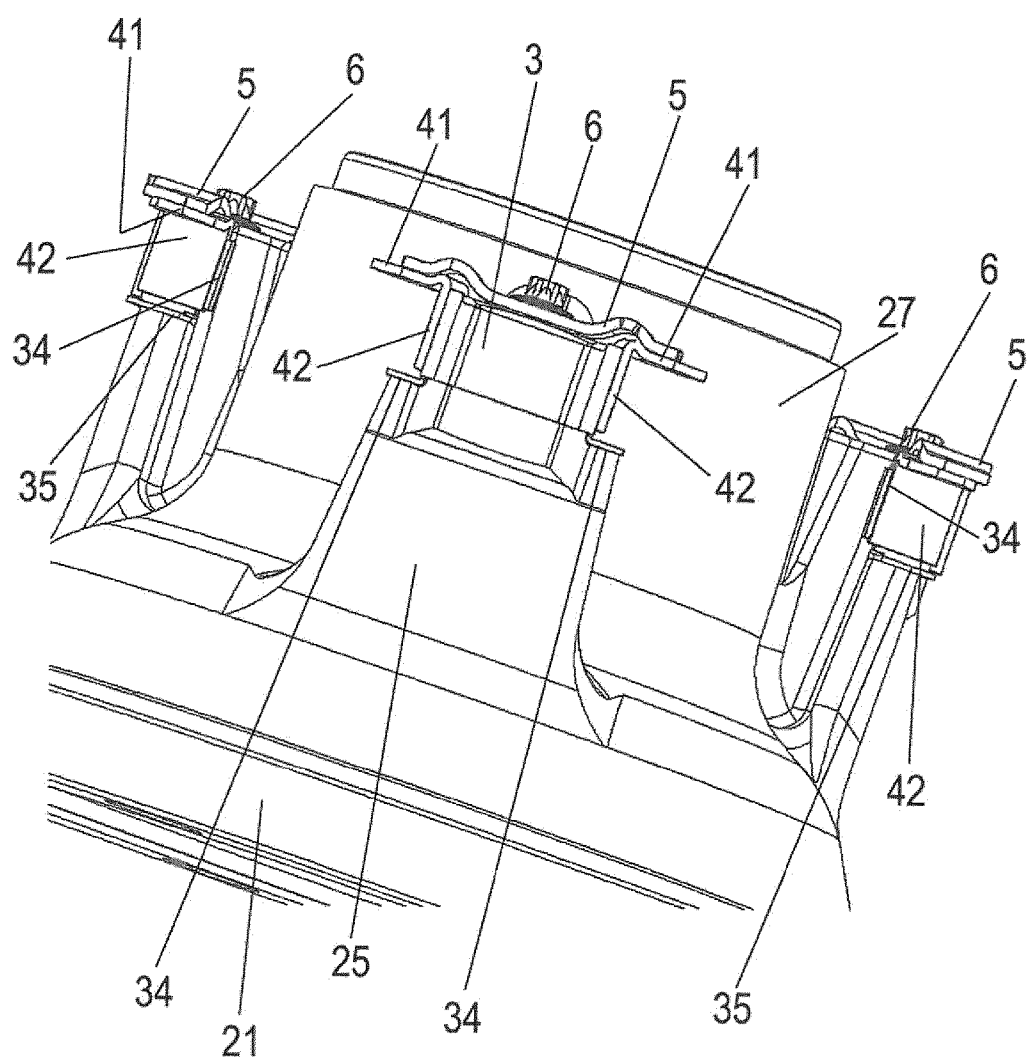
FIG. 9 is a perspective view from above of the hub with the first and second intermediate elements mounted on the drivers and spring elements holding said elements.
Figure 10:
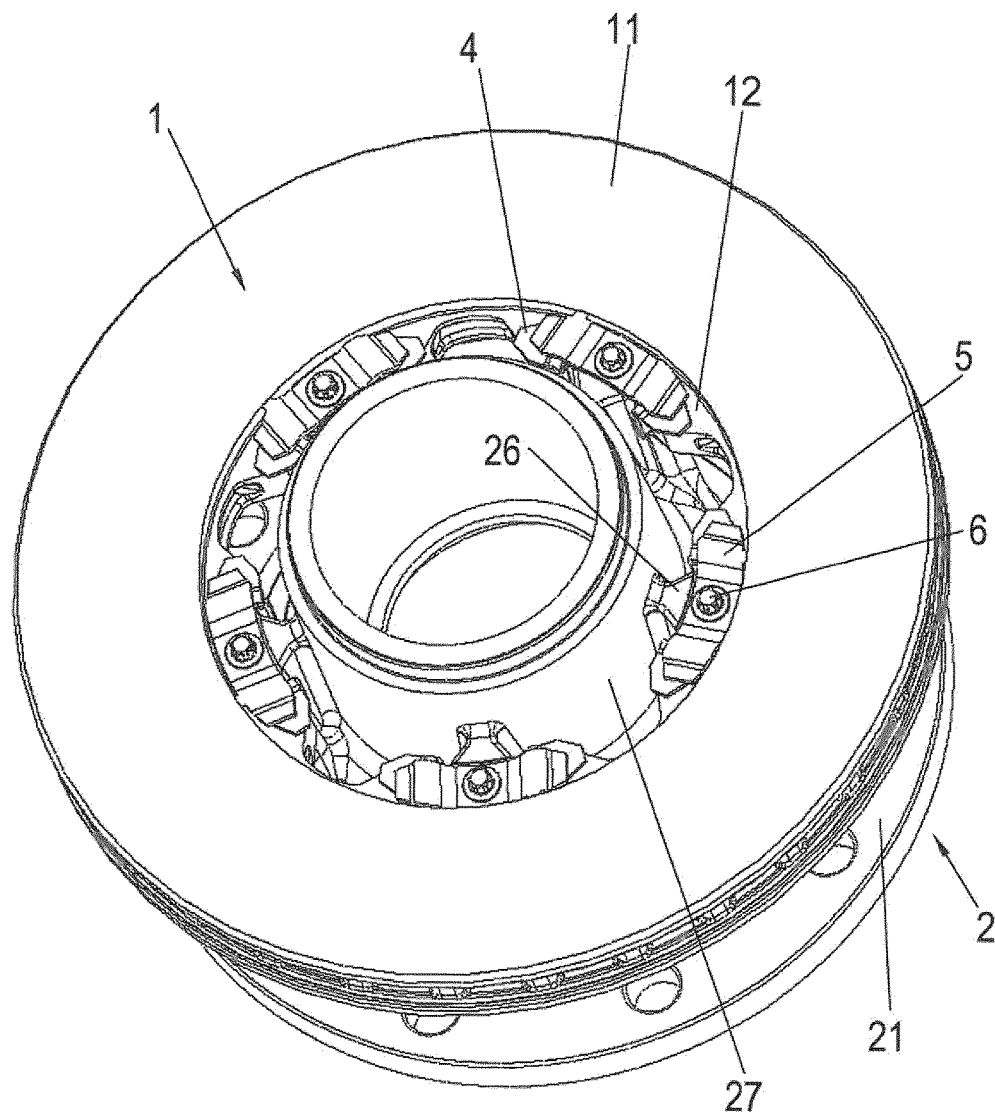
FIG. 10 is a perspective view of the brake disc and the hub in the mounted state with five drivers.
Figure 11:
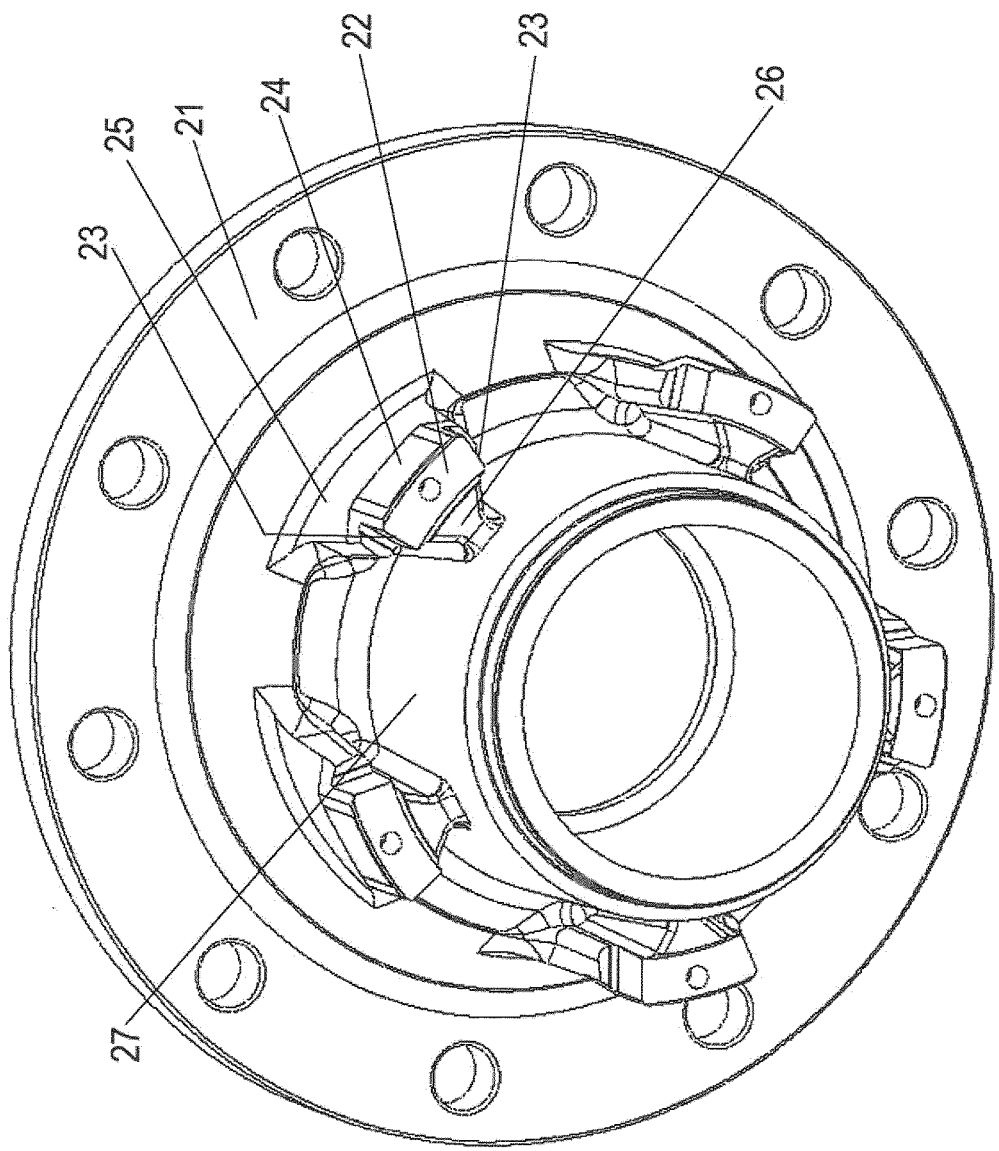
FIG. 11 is a perspective view of a hub configured with five drivers.
Figure 12:
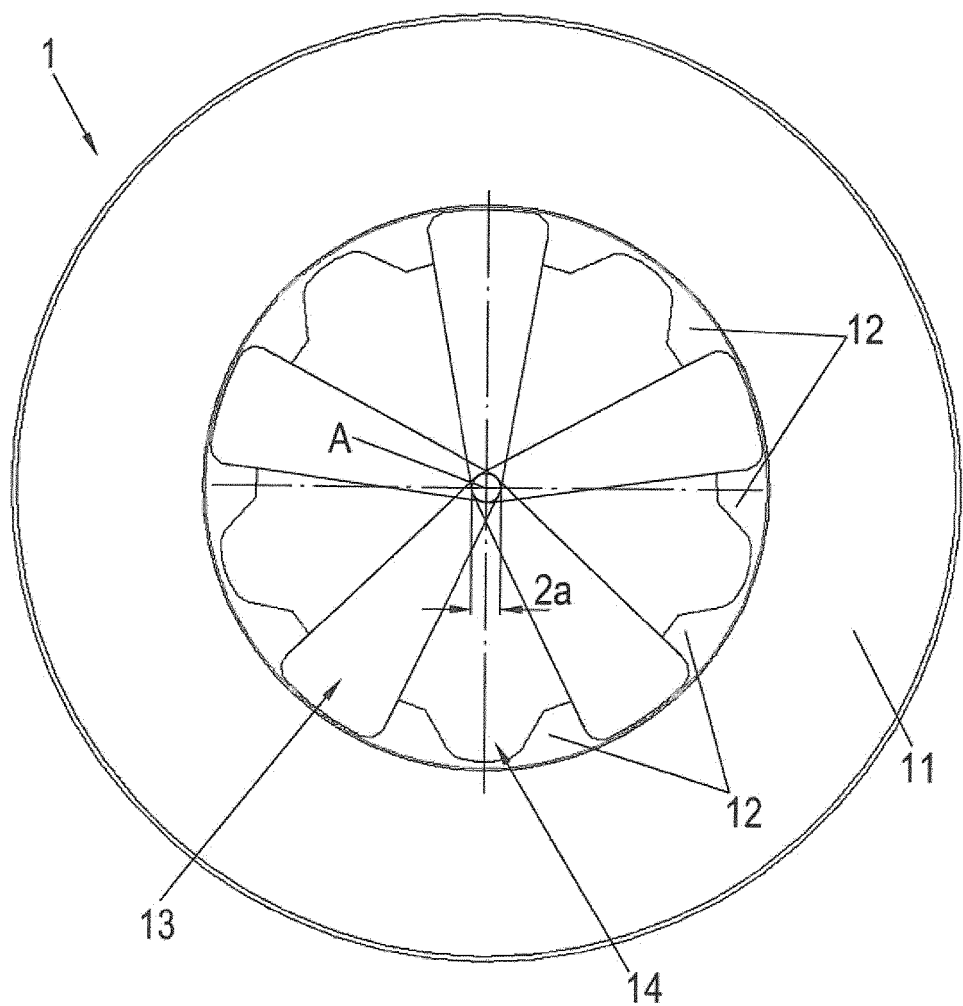
FIG. 12 is a plan view of the brake disc of FIG. 10 with ten corresponding supporting elements.

The first intermediate element 3 and the respective second intermediate element 4 are in this case preferably positively connected together. The second intermediate elements 4 in this case, as is clearly visible in FIGS. 8 and 9, are preferably configured as angled elements with two arms 41, 42 oriented at an angle, in particular at right angles to one another.

In the mounted state, a first arm 42 is clamped between the lateral flanks 15 of one of the supporting elements 12 and the lateral flanks 31, 32 of one of the first intermediate elements 3. A second arm 41 bears against the front face of the supporting element 12 remote from the wheel flange 21 of the hub.

The first intermediate elements 3 and preferably also the second intermediate elements 4 are preferably produced from a non-rusting material or alternatively or additionally provided with a non-rusting coating in order to prevent permanently an adhesion of the surfaces bearing against one another of the first intermediate elements 3 and the second intermediate elements 4, so that when dismantling the brake disc in the case of servicing a slight axial displacement of the brake disc to the front, i.e. away from the wheel flange 21 of the hub 2, is possible. Also, an anti-seize coating of the intermediate elements 3, 4 is conceivable.

By the shape, in particular, of the first intermediate elements 3 these elements form in the region of the brake disc-hub connection a separating layer between the brake disc 1 and the hub 2, so that at any point in the region of the brake disc-hub connection the brake disc 1 is not directly in contact with the hub.

For the axial fixing of the brake disc 1 on the hub 2 and the first intermediate elements 3 and/or second intermediate elements 4 arranged in the region of the brake disc-hub connection a spring element 5 is able to be fastened on a side of the drivers 22 remote from the wheel flange 21 of the hub 2, for example screwed by a screw 6 in a screw bore 28 in the driver 22.

Whilst the hub 2 and/or brake disc 1 shown in FIGS. 1 to 4 and 9 has a total of three drivers 22 and/or six supporting elements 12, it is also conceivable to configure the brake disc-hub connection such that a hub has a total of four or five drivers 22 and the brake disc 1 accordingly has eight or ten supporting elements 12 as shown in FIGS. 10 to 15.

With a toothing having such a number of drivers 22 and/or supporting elements 12 engaging in one another, a reliable braking torque transmission is optimally permitted, with at the same time recesses 14 dimensioned to be of sufficiently large size on the inner circumference of the brake disc 1, a sufficient ventilation of the brake disc 1 and the hub 2 being permitted thereby.

A further variant of the brake disc-hub connection with alternatively designed support struts 25 and first and second intermediate elements 3, 4 is shown in FIGS. 16 to 22.

Figure 17:
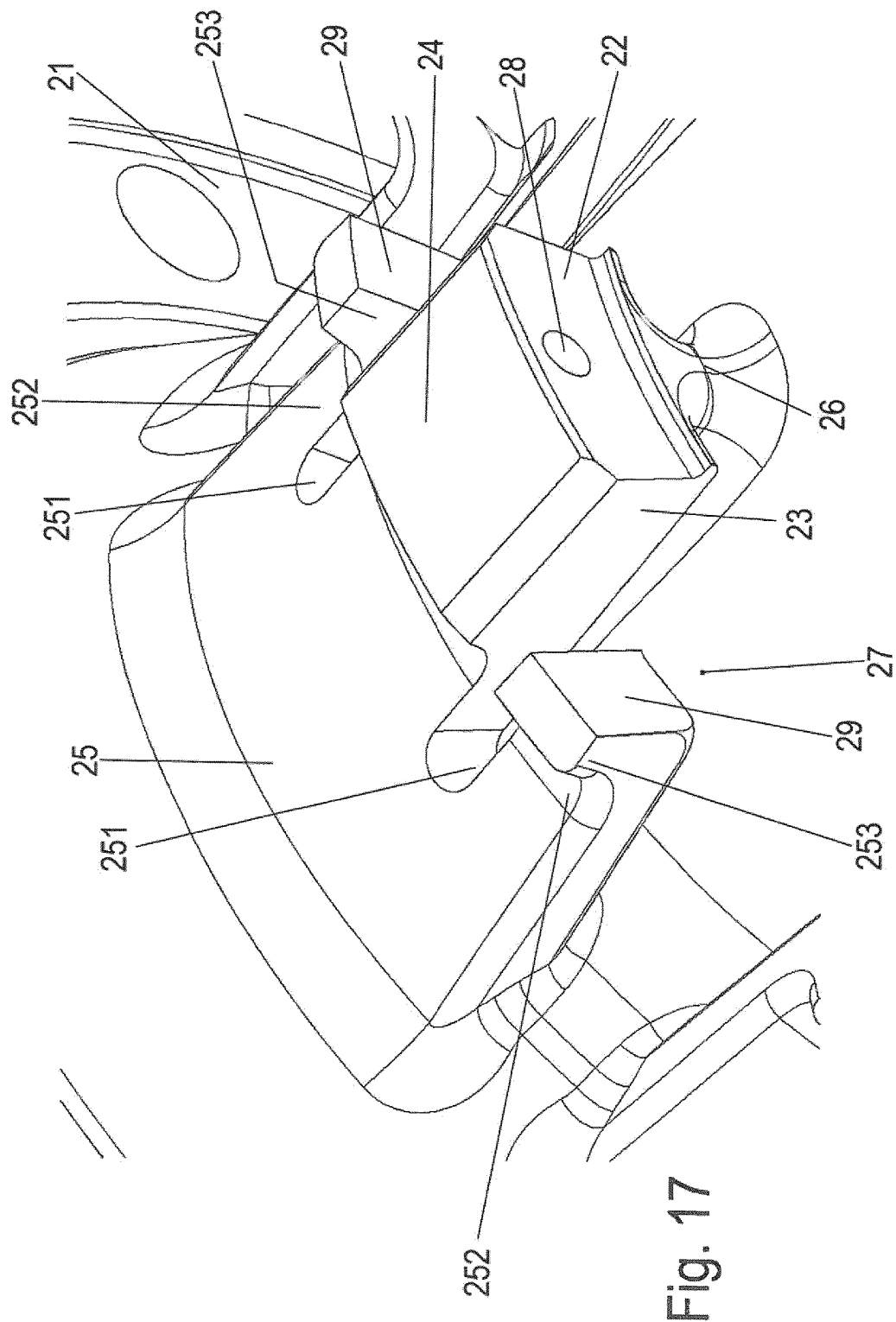
FIG. 17 is a perspective detailed view of the hub shown in FIG. 16 without the first and second intermediate elements mounted on the driver.

As may be seen in FIG. 17, in particular, the support webs 25 comprise slots 251 extending axially from the driver 22 in the direction of the wheel flange 21. These slots 251 preferably extend in this case along the length of the lateral flanks 23 of the drivers 22. The lateral support webs 252 separated by one respective slot 251 from the central region of the support webs 25 are preferably configured at their free ends 253 to be bent back radially relative to the rotational axis of the brake disc 1 in an L-shaped manner, so that the front faces facing the brake disc 1 and/or the first intermediate elements 3 have an enlarged surface relative to the cross section of the support webs 252. The front faces of the support webs in this case serve as axial push-on stops 29 for the axial fixing of the brake disc 1. By the separation of the axial push-on stops 29, thus configured, thermally induced stresses in the hub 2 may be avoided, in particular in the transition region between the lateral flanks 23 of the drivers 22 and the push-on stops 29.

The axial length of the slots 251 in this case is preferably more than 10 mm, particularly preferably between 15 mm and 17 mm.

Figure 19:
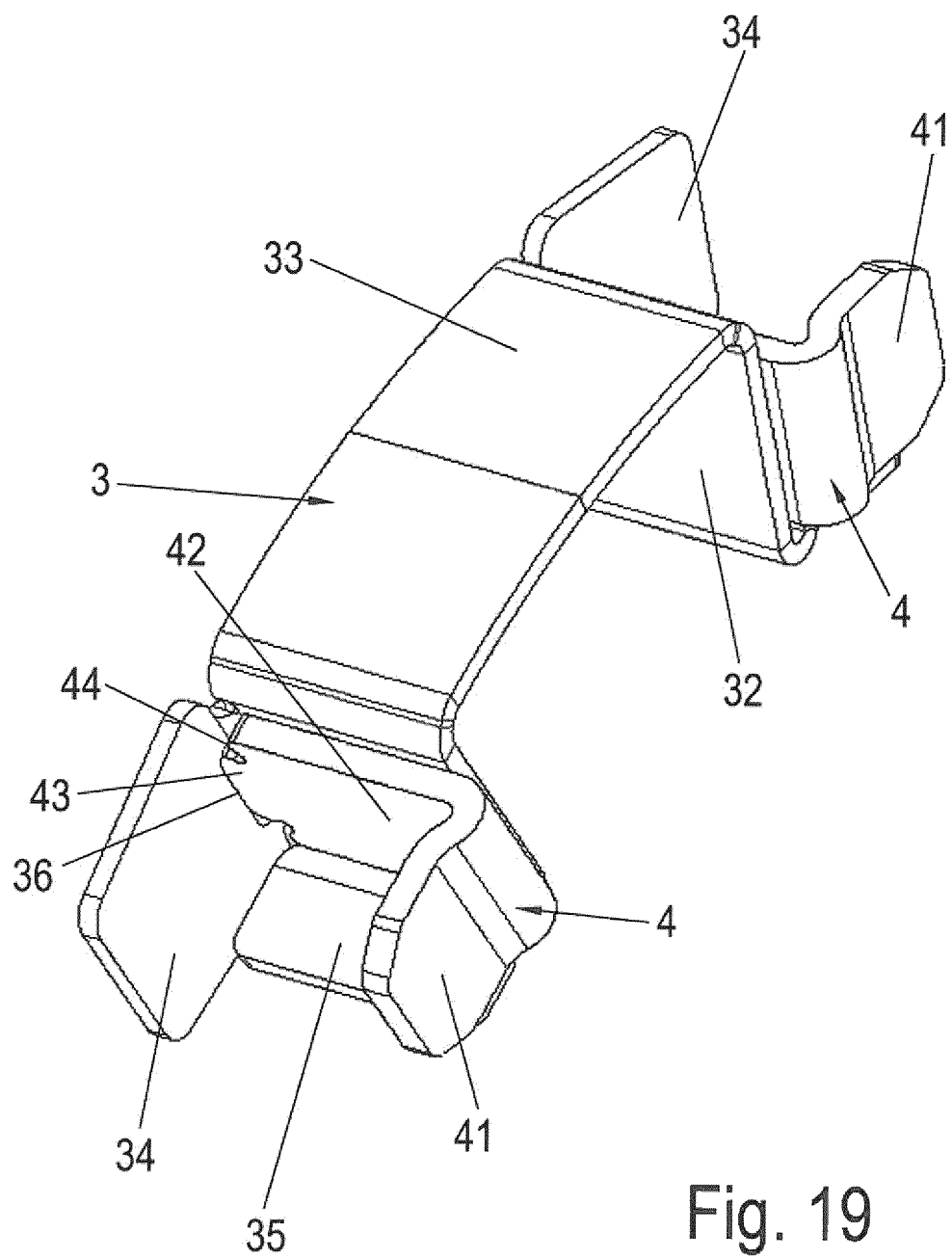
FIGS. 19 to 21 are perspective views of the first and second intermediate elements shown in FIGS. 16 and 18.
Figure 20:
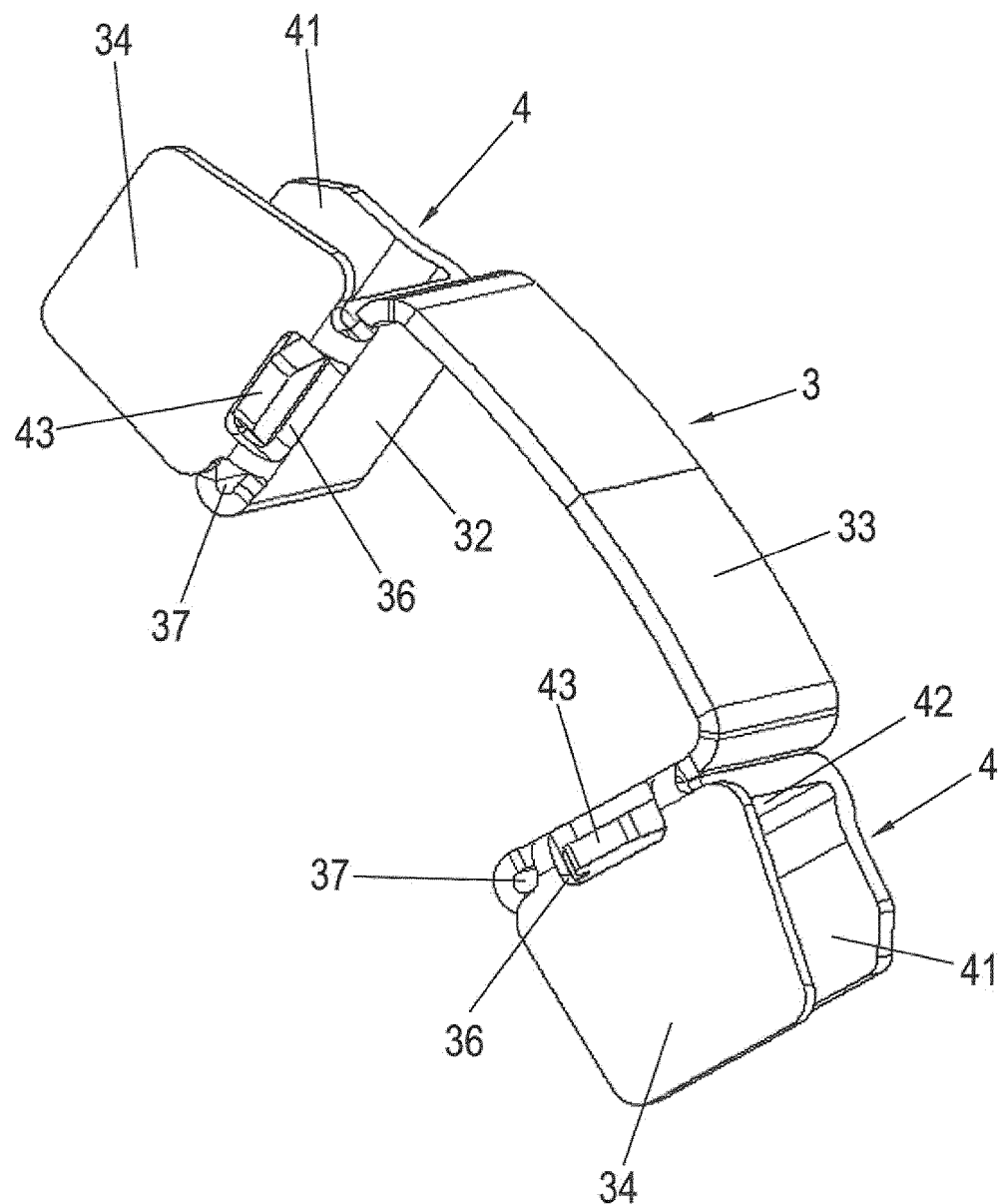
Figure 21:
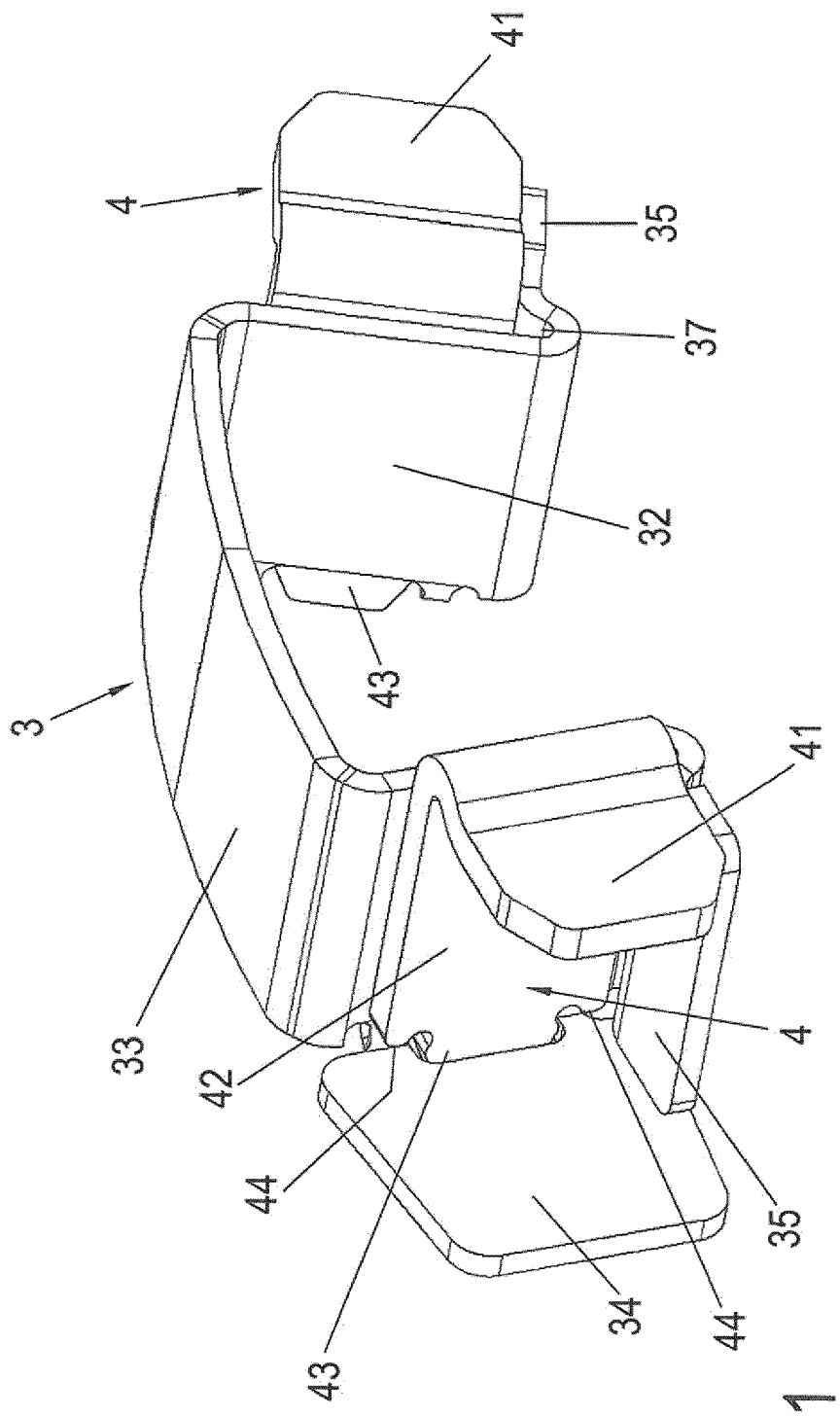

As is shown in FIGS. 19 to 21, in the variants shown in these figures of the first and second intermediate elements 3, 4 for securing the second intermediate elements 4 against circumferential slippage, the transitions between the separating webs 35 and the arms 31, 32 of the first intermediate elements 3 extending approximately radially to the rotational axis of the brake disc 1 are configured as depressions 37, respective lower edges of the first arm 42 of the second intermediate elements 4 being able to be supported in said depressions by being introduced therein.

In order to prevent effectively the second intermediate elements 4 from migrating radially relative to the rotational axis of the brake disc 1 after the mounting thereof on the first intermediate elements 3, openings 36 of slot-shaped configuration are preferably provided on regions of the separating surfaces in the vicinity of the lateral arms 34 of the first intermediate elements, in each case a nose 43 of one of the second intermediate elements 4 extending therethrough in the mounted state. The nose 43 extends in this case from the end of the first arm 42 of the second intermediate element 4, spaced apart from the second arm 41 of the second intermediate element 4, preferably in a linear manner.

The width of the nose 43 (radially to the rotational axis of the brake disc 1) in this case is preferably smaller than the width of the first arm 42 of the second intermediate element 4. The edge regions 44 of the first arm 42 protruding over the lateral edges of the nose 43 serve in this case as a stop in order to limit the penetration depth of the nose 43 in the opening 36 of the first intermediate element 3 during mounting.

Figure 18:
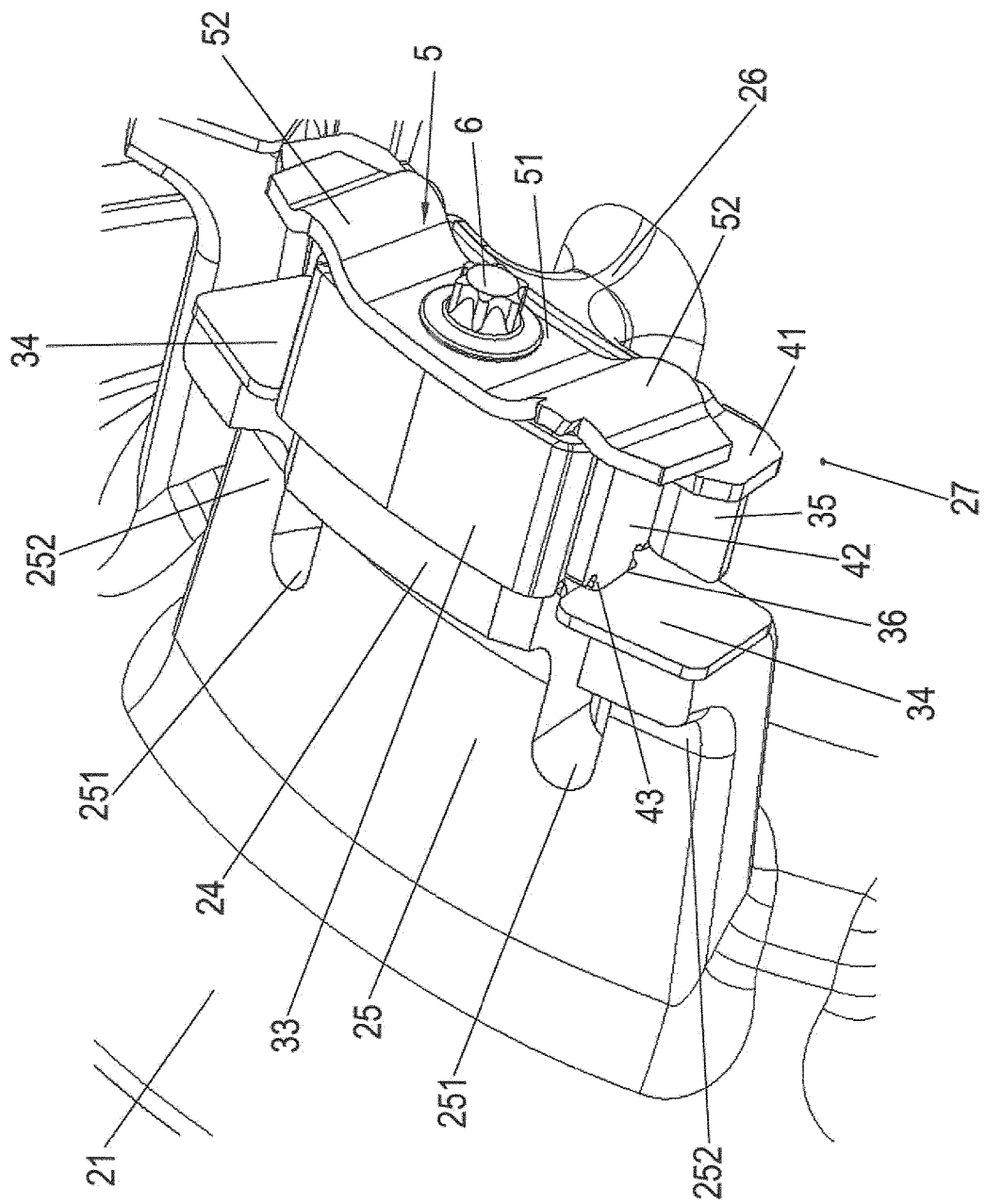
FIG. 18 is a perspective detailed view of the hub shown in FIG. 16 according to FIG. 17 with the first and second intermediate elements mounted on the driver.

FIG. 18 shows in a perspective view the first and second intermediate elements 3, 4 in the state mounted on the hub 2. It is clearly visible that the noses 43 of the second intermediate elements 4 extend through the openings 36 of the first intermediate elements 3 as far as the slots 251 of the support webs 25.

Figure 22:
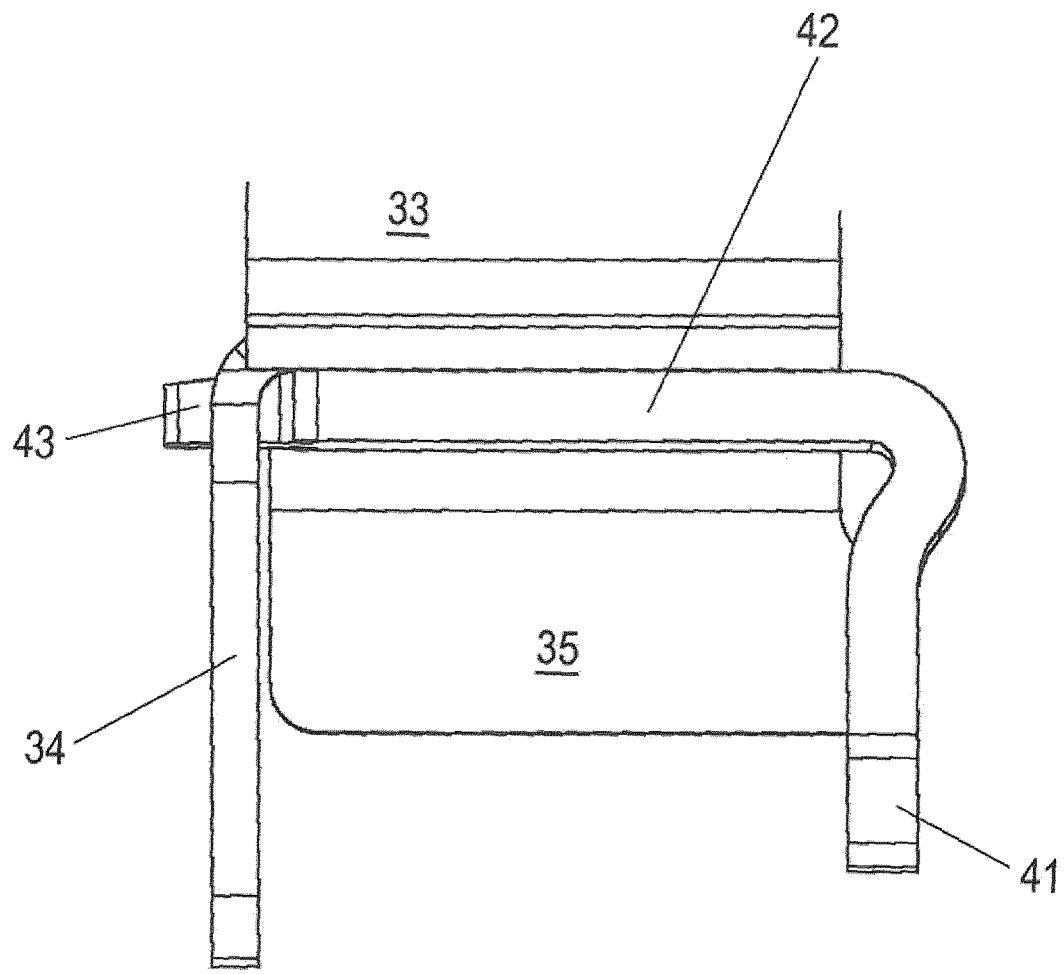
FIG. 22 is a plan view of the first and second intermediate elements shown in FIGS. 19 to 21.

FIG. 22 shows in a plan view the nose 43 of one of the second intermediate elements 4, pushed into the opening 36 of the first intermediate element 3.

The features explained by means of variants shown in FIGS. 16 to 22, relating to the slots 251, depressions 37, openings 36 and noses 43 in this case are also conceivable in the hub 2 shown in FIGS. 13 to 15.

Figure 23:
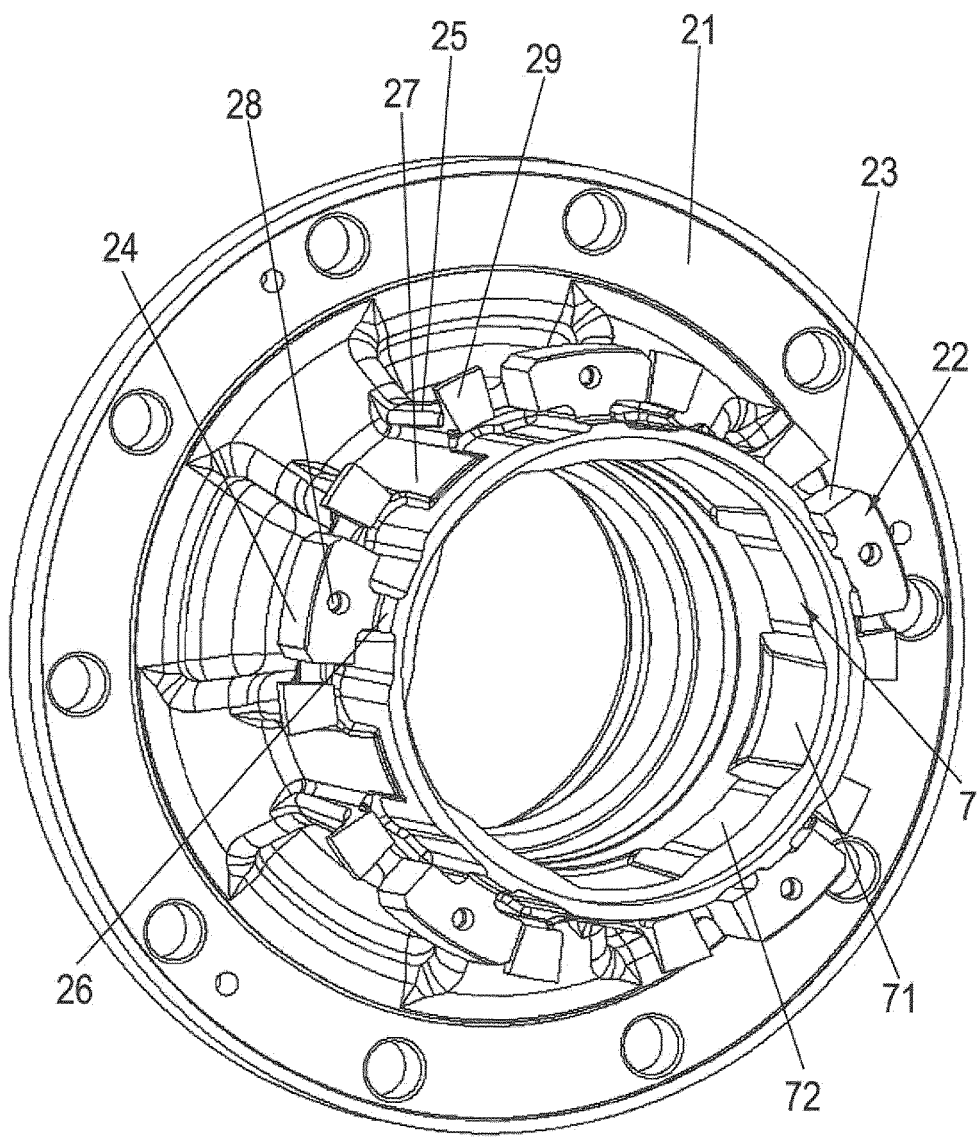
FIGS. 23 and 24 are perspective views of a further variant of a hub configured with five drivers without intermediate elements.
Figure 24:
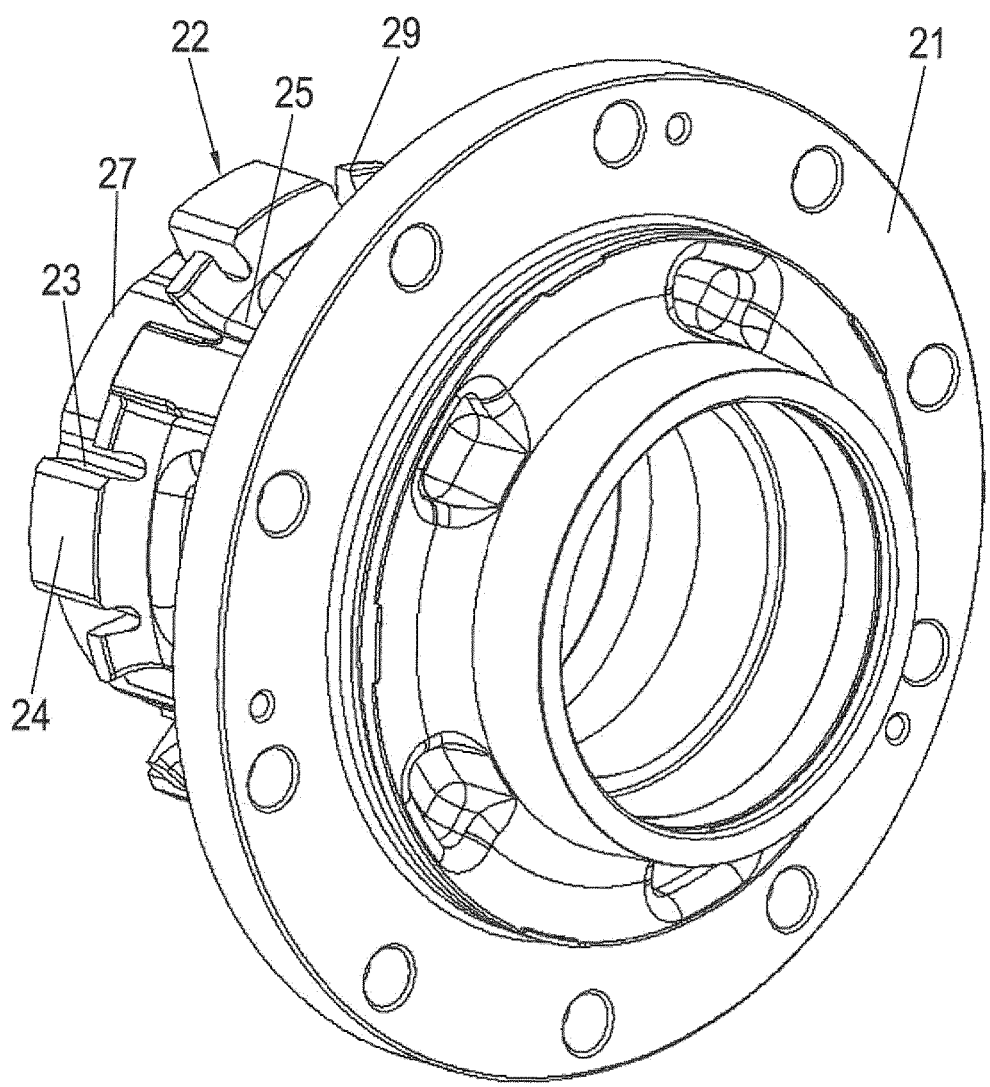

A further variant of the brake disc-hub connection with alternatively designed support struts 25 and first and second intermediate elements 3, 4 is shown in FIGS. 23 and 24. This variant is suitable, in particular, for attaching to a rear axle of a utility vehicle.

As may be seen in both FIGS. 23 and 24, the support struts 25 in this variant extend axially from the push-on stops 29 in the direction of the wheel flange 21. In the vicinity of the push-on stops 29, the support webs 25 widen in the circumferential direction of the hub 2. The flanks 23 of the drivers 22 in this case are separated by the slots 251 from the push-on stops 29. Also, the slots 251 extend in this case along the length of the lateral flanks 23 of the drivers 22.

The inner surface of the hub 2 in this case is configured with an internal contour 7. In the variant shown this internal contour has recesses 71 and raised portions 72 which are integrally formed adjacent to one another, alternating in the circumferential direction. The internal contour 7 in this case serves for meshing with an axle, in particular a rear axle, of the utility vehicle.

LIST OF REFERENCE NUMERALS

1 Brake disc
11 Friction ring
12 Supporting elements
13 Recess
14 Recess
15 Flanks
16 Lower face
2 Hub
21 Wheel flange
22 Driver
23 Flanks
24 Upper surface
25 Support strut
251 Slot
252 Arm
253 Free end
26 Webs
27 Pot-shaped portion
28 Screw bore
29 Push-on stop
3 First intermediate element
31 Arm
32 Arm
33 Bridging element
34 Separating surface
35 Separating webs
36 Opening
37 Depression
4 Second intermediate element
41 Second arm
42 First arm
43 Nose
44 Edge region
5 Spring element
51 Central region
52 Spring leg
6 Screw
7 Inner contour
71 Recess
72 Raised portion
A Rotational axis
$f_B$ Braking force The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disc-hub connection, comprising:
   a brake disc having supporting elements arranged on an inner circumference thereof, the supporting elements extending in a direction of a rotational axis of the brake disc;
   a hub having a wheel flange, wherein drivers extend from the wheel flange in an axial direction relative to the rotational axis common to the brake disc and the hub, the drivers engaging in a toothed manner between the supporting elements arranged on the inner circumference of the brake disc;
   wherein
      lateral flanks of the drivers are oriented radially to the rotational axis and lateral flanks of the supporting elements are oriented parallel to the lateral flanks of the drivers,
      the lateral flanks of each of the drivers are oriented at an angle ($\alpha$) of 15° to 30° to each other, the drivers are configured as front ends of support webs extending axially away from the wheel flange, each of the drivers has slots extending axially in the direction of the wheel flange to form lateral support webs, and the front faces of the free ends of the support webs are configured as a push-on stop for axially fixing the brake disc.

2. The brake disc-hub connection as claimed in claim 1, wherein the lateral flanks of each of the drivers, viewed from the rotational axis, are oriented at an angle (α) of 15° to 30° to one another.

3. The brake disc-hub connection as claimed in claim 1, wherein the lateral flanks of each of the drivers, viewed from the rotational axis, are oriented at an angle (α) of 23° to 25° to one another.

4. The brake disc-hub connection as claimed in claim 1, wherein the hub has a total of three, four or five drivers and the brake disc correspondingly has six, eight or ten supporting elements, and the hub has a wheel flange extending radially outwardly to the rotational axis, the drivers extending axially therefrom relative to the rotational axis.

5. The brake disc-hub connection as claimed in claim 4, wherein the hub has a pot-shaped hollow cylindrical portion which merges with the wheel flange extending radially outwardly to the rotational axis, and the drivers are supported by webs rising radially outwardly from the pot-shaped portion and extending axially toward the wheel flange.

6. The brake disc-hub connection as claimed in claim 1, wherein the push-on stop is integrally formed on at least one of the lateral flanks of each of the drivers, for axially fixing the brake disc.

7. The brake disc-hub connection as claimed in claim 1, wherein first intermediate elements are arranged in intermediate spaces between the lateral flanks of the drivers and the supporting elements, and the first intermediate elements encompass the drivers in a radial and U-shaped manner in the circumferential direction and bear at least against the opposing flanks of the drivers in a planar manner.

8. The brake disc-hub connection as claimed in claim 7, wherein second intermediate elements are arranged between the lateral flanks of the supporting elements and the arms of the first intermediate elements bearing against the lateral flanks of the drivers, and the second intermediate elements are mountable separately from the first intermediate elements.

9. The brake disc-hub connection as claimed in claim 8, wherein the first intermediate elements and the second intermediate elements are arranged so as to be displaceable relative to one another, axially relative to the rotational axis.

10. The brake disc-hub connection as claimed in claim 8, wherein the second intermediate elements are configured as angled elements with two arms oriented at an angle, and in the mounted state a first arm is clamped between the lateral flank of one of the supporting elements and the lateral flank of one of the first intermediate elements and a second arm bears against the front face of the supporting element remote from the wheel flange of the hub.

11. The brake disc-hub connection as claimed in claim 8, wherein the first intermediate elements and the second intermediate elements are made of a non-rusting material, are provided with a non-rusting coating and/or have an anti-seize coating.

12. The brake disc-hub connection as claimed in claim 8, wherein in a region of the brake disc-hub connection, the first intermediate elements form a separating layer between the brake disc and the hub.

13. The brake disc-hub connection as claimed in claim 12, wherein free ends of the arms of the first intermediate elements extending approximately radially to the rotational axis are configured as separating webs bent back outwardly and extending axially to the rotational axis, in each case a lower face of the supporting elements extending axially to the rotational axis or a lower edge of the first arm of the second intermediate element is able to be supported on said separating webs.

14. The brake disc-hub connection as claimed in claim 13, wherein the transitions between the separating webs and the arms extending approximately radially to the rotational axis are configured as depressions, the lower edge of the first arm of the second intermediate element being able to be supported in said depressions by being inserted therein.

15. The brake disc-hub connection as claimed in claim 12, wherein separating surfaces are integrally formed on the lateral arms of the first intermediate elements, on a side facing the wheel flange of the hub oriented parallel to the plane of the brake disc, which in each case cover one of the push-on stops for axially fixing the brake disc.

16. The brake disc-hub connection as claimed in claim 14, wherein the first intermediate element and the respective second intermediate element are positively connected together.

17. The brake disc-hub connection as claimed in claim 15, wherein openings are formed on a region of the separating surfaces in the vicinity of the lateral arms of the first intermediate elements, in each case a nose of one of the second intermediate elements extending therethrough in the mounted state, and the nose extends from the end of the first arm spaced apart from the second arm.

18. The brake disc-hub connection as claimed in claim 17, wherein a spring element is able to be fastened on a side of the drivers remote from the wheel flange of the hub, for axially fixing the first intermediate elements and/or the second intermediate elements.

* * * * *